US010817854B2

(12) United States Patent
Sirota et al.

(10) Patent No.: US 10,817,854 B2
(45) Date of Patent: *Oct. 27, 2020

(54) PROVIDING CONFIGURABLE PRICING FOR EXECUTION OF SOFTWARE IMAGES

(71) Applicant: Amazon Technologies, Inc., Reno, NV (US)

(72) Inventors: Peter Sirota, Seattle, WA (US); James Alfred Gordon Greenfield, Cape Town (ZA); Don Johnson, Seattle, WA (US); Attila Narin, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 1906 days.

This patent is subject to a terminal disclaimer.

(21) Appl. No.: 14/300,117

(22) Filed: Jun. 9, 2014

(65) Prior Publication Data

US 2014/0289105 A1    Sep. 25, 2014

Related U.S. Application Data

(63) Continuation of application No. 11/963,331, filed on Dec. 21, 2007, now Pat. No. 8,788,379.

(51) Int. Cl.
*G06F 40/00* (2020.01)
*G06Q 20/10* (2012.01)
(Continued)

(52) U.S. Cl.
CPC .............. *G06Q 20/10* (2013.01); *G06F 8/63* (2013.01); *G06F 9/45558* (2013.01);
(Continued)

(58) Field of Classification Search
None
See application file for complete search history.

(56) References Cited

U.S. PATENT DOCUMENTS 5,826,244 A    10/1998    Huberman
6,021,397 A     2/2000    Jones et al.
(Continued)

OTHER PUBLICATIONS

"Metering and Accounting for Web Services," IBM®, Jul. 2001, retrieved from http://www-106.ibm.com/developerworks/library/ws-maws/, 6 pages.

(Continued)

*Primary Examiner* — Olabode Akintola
(74) *Attorney, Agent, or Firm* — Robert C. Kowert; Kowert, Hood, Munyon, Rankin & Goetzel, P.C.

(57) ABSTRACT

Techniques are described for facilitating sharing of executable software images between users in a configurable manner. In at least some situations, the executable software images are virtual machine images, and while executing may access and use remote network-accessible services (e.g., Web services). In addition, some or all shared executable software images may be made available in a fee-based manner by creator users, such that execution of such a fee-based software image by a software image execution service on behalf of a user other than the creator user is performed in exchange for fees from the other user as specified by the creator user. The creator user may further receive at least some of the specified fees paid by the other user, such as at least some of a difference between the specified fees and fees charged by the software image execution service for the execution.

15 Claims, 19 Drawing Sheets

(51) Int. Cl.
*G06Q 30/04* (2012.01)
*G06F 9/455* (2018.01)
*G06Q 20/34* (2012.01)
*G06Q 20/14* (2012.01)
*G06F 8/61* (2018.01)
*G06Q 30/06* (2012.01)
*G06F 21/12* (2013.01)

(52) U.S. Cl.
CPC ............ *G06F 21/12* (2013.01); *G06Q 20/145* (2013.01); *G06Q 20/3552* (2013.01); *G06Q 30/04* (2013.01); *G06Q 30/06* (2013.01); *G06F 2009/45562* (2013.01)

(56) References Cited

U.S. PATENT DOCUMENTS

| | | | |
|---|---|---|---|
| 6,078,906 | A | 6/2000 | Huberman |
| 9,262,146 | B1* | 2/2016 | Gupta .................... G06F 8/65 |
| 2001/0042785 | A1 | 11/2001 | Walker et al. |
| 2002/0120461 | A1 | 8/2002 | Kirkconnell-Ewing et al. |
| 2002/0120519 | A1 | 8/2002 | Martin et al. |
| 2003/0149696 | A1* | 8/2003 | Nelson ................... G06Q 30/06 |
| 2003/0195813 | A1 | 10/2003 | Pallister et al. |
| 2003/0236831 | A1* | 12/2003 | Ortiz ................. H04N 1/00127 709/204 |
| 2003/0236832 | A1* | 12/2003 | McIntyre ............. H04L 67/325 709/204 |
| 2004/0117302 | A1 | 6/2004 | Weichert et al. |
| 2004/0117311 | A1 | 6/2004 | Agarwal et al. |
| 2004/0122926 | A1 | 6/2004 | Moore et al. |
| 2004/0243583 | A1 | 12/2004 | Olsen |
| 2004/0260658 | A1 | 12/2004 | Dettinger et al. |
| 2007/0271191 | A1* | 11/2007 | Torrubia-Saez ........ G06F 21/10 705/59 |
| 2009/0049160 | A1* | 2/2009 | Cherian .................. H04L 67/34 709/222 |

OTHER PUBLICATIONS

"NTT Com to Launch Asia's First UDDI Registry on Oct. 9," Oct. 8, 2002, NTT Communications, retrieved Sep. 9, 2005, from http://www.ntt.com/release_e/news02/0010/1008.html, 3 pages.
"The Bowstreet™ Business Web Exchange Fuels B2B Revolution With First-of-its-Kind 'Web Services' Marketplace," Mar. 16, 2000, Bowstreet.com Inc., retrieved Sep. 9, 2005, from http://web.archive.org/web/20010219033902/http://www.bowstreet.com/news/press_release . . . , 4 pages.
"The Web Services Architect: Catalysts for Fee-Based Web Services," IBM®, Nov. 2001, retrieved from http://www-106.ibm.com/developerworks/library/ws-arc6/, 7 pages.
"Web Service Use Case," ContentGuard Holdings, Inc., retrieved Aug. 9, 2005, from http://www.contentguard.com/reference/docs/SimpleWebServiceExampleContent.htm, 4 pages.
"Web Service Use Case: Travel Reservation—Use Case 5 May 2002," W3C®, May 2002, retrieved Aug. 9, 2005, from http://www.w3.org/2002/06/ws-example, 9 pages.
"Web Services Architecture Usage Scenarios—W3C Working Draft Jul. 30, 2002," W3C®, Jul. 2002, retrieved Apr. 4, 2008, from http://www.w3.org/TR/2002/WD-ws-arch-scenarios-20020730/, 51 pages.
"Web Services Marketplace," Epicentric, retrieved Sep. 9, 2005, from http://web.archive.org/web/20010404230735/www.epicentric.com/solutions/mkt.jsp, 4 pages.
Actional™, "The Web Services Management Platform: Managing the Impact of Change in an Enterprise Web Services Network," Mar. 2003, retrieved Nov. 7, 2003, from http://www.actional.com/downloads/products/managing.enterpriseweb.services.network.pdf, 26 pages.

Actional™, "Web Services Management Platform," retrieved Nov. 7, 2003, from http://www.actional.com/products/web_services/index.asp, 3 pages.
Albrecht et al., "Market Place and Technology Standards for B2B. Ecommerce: Progress and Challenges," MIS Quarterly Special Issue on Standard Making, International Conference on Information Systems, Dec. 2003, Seattle, WA, pp. 188-209, 23 pages.
Allidex, "Frequently Asked Questions," retrieved Nov. 4, 2003, from http://www.allidex.com/faq.html, 4 pages.
Amazon.com, Inc., "Associates: Enhance Your Site Using Web Services," retrieved Nov. 4, 2003, from http://www.amazon.com/gp/browse.html/ref=sc_bb_1_1/104-7530911-9659969?no=3435361&me=A3.6.L, 2 pages.
Amazon.com, Inc., "Developers: Build Solutions for Amazon Partners," retrieved Nov. 4, 2003, from http://www.amazon.com/gp/browse.html/ref=sc_bb_1_1/104-7530911-9659969?no=3435361&me=A3.6.L, 2 pages.
Amazon.com, Inc., "Sellers and Vendors: Sell More Using Web Services," retrieved Nov. 4, 2003, from http://www.amazon.com/gp/browse.html/ref=sc_bb_1_1/104-7530911-9659969?no=3435361&me=A3.6.L, 1 page.
Amazon.com, Inc., "Web Services FAQ's," retrieved Nov. 4, 2003, from http://www.amazon.com/gp/browse.html/ref=sc_bb_1_0/104-7530911-9659969?no=3435361&me=A3.6.L, 11 pages.
Amazon.com, Inc., "Web Services," retrieved Nov. 4, 2003, from http://www.amazon.com/gp/browse.html/104-7530911-9659969?node=3435361, 2 pages.
Amazon.com, Inc., Web Services, "Amazon Elastic Compute Cloud (Amazon EC2)—Limited Beta," retrieved Oct. 13, 2007, from http://www.amazon.com/b/ref=sc_fe_1_2/105-1515636-7955636?ie=UTF8&node=201590011& . . . , 5 pages.
Amazon.com, Inc., Web Services, "Amazon Simple Storage Service (Amazon S3)," retrieved Oct. 13, 2007, from http://www.amazon.com/S3-AWS-home-page-Money/b/ref=sc_fe_1_2/105-1515636-7955636?ie . . . , 5 pages.
Amazon.com, Inc., Web Services, "Amazon Simple Queue Service (Amazon SQS)," retrieved Oct. 13, 2007, from http://www.amazon.com/Simple-Queue-Service-home-page/b/ref=sc_fe_1_2/105-15156367955 . . . , 4 pages.
Amazon.com, Inc., "Paid AMIs," retrieved Oct. 13, 2007, from http://docs.amazonwebservices.com/AWSEC2/2007-03-01/DeveloperGuide/Paid_AMIs.html, 1 page.
Amazon.com, Inc., Web Services, "Tech. Note: Using Paid AMIs and the Demo Paid AMI," retrieved Oct. 13, 2007, from http://developer.amazonwebservices.com/connect/entry.jspa?externalID=866, 2 pages.
Amazon.com, Inc., "Paying for AMIs," retrieved Oct. 13, 2007, from http://docs.amazonwebservices.com/AWSEC2/2007-03-01/DeveloperGuide/AESDG-chapter-usi . . . , 2 pages.
Andrews et al., "Specification: Business Process Execution Language for Web Services Version 1.1," IBM developerWorks, May 5, 2003, retrieved Jan. 31, 2005, from http://www-106.ibm.com/developerworks/webservices/library/ws-bpel/, 124 pages.
Binstock, "Staking New Territory, Breaking New Ground," retrieved Sep. 9, 2005, from http://archive.devx.com/javaSR/articles/binstock/binstockp.asp, 6 pages.
Box et al., "Web Services Policy Framework (WS-Policy)," Jun. 2, 2003, retrieved Sep. 12, 2005, from ftp://www6.software.ibm.com/software/developer/library/ws-policy2003.pdf, 21 pages.
Brown, "Epicentric Unveils Web Services E-Hub," Mar. 21, 2001, Line56.com, retrieved Sep. 9, 2005, from http://www.line56.com/print/default.asp?ArticleID=2287, 2 pages.
Bunting et al., "Web Services Composite Application Framework (WS-CAF)," Jul. 28, 2003, retrieved Sep. 12, 2005, from http://www.oasis-open.org/committees/download.php/4343/WS-CAF%20Primer.pdf, 23 pages.
Burbeck, "The Tao of E-Business Services—The Evolution of Web Applications Into Service-Oriented Components With Web Services," IBM®, Oct. 2000, http://www-4.ibm.com/software/developer/library/ws-tao/index.html, 13 pages.
Business Wire, "Desktop.com Introduces Devtop, the First Integrated Platform for Building, Deploying, and Distributing Web-

(56) References Cited

OTHER PUBLICATIONS

Based Applications," Jun. 26, 2000, retrieved Sep. 8, 2005, from http://www.findarticles.com/p/articles/mi_m0EIN/is_2000_June_26/ai_62915951/print, 2 pages.

Clark, "Business Architecture For A Web Services Brokerage—Understanding The Business Context Of Web Services," Aug. 1, 2001, retrieved Aug. 2, 2005, from http://www.webservicesarchitect.com/content/articles/clark01print.asp, 5 pages.

CPA2Biz, Inc., "New Rivio™ Business Services Suite," Apr. 18, 2001, retrieved Sep. 22, 2005, from https://www.cpa2biz.com/Corp/Press+Releases/PR_WebTools_18APR01.htm, 3 pages.

CPA2Biz, Inc., "Verizon Unveils Rivio™ Web Services Suite for Small Business Customers," May 29, 2001, retrieved Sep. 22, 2005, from https://www.cpa2biz.com/Corp/Press+Releases/PR_VERIZON_29MAY01.htm, 3 pages.

E2OPEN™, "E2open Products," retrieved Nov. 7, 2003, from http://www.e2open.com/products/, 3 pages.

E2OPEN™, "The E2open Integration Platform," retrieved Nov. 7, 2003, from http://www.e2open.com/downloads/e2open_integration_platform_datasheet.pdf, 5 pages.

ebizQ, "Product Quicktake," retrieved Nov. 7, 2003, from http://www.ebizq.net/reports/1884.html?download=1, 2 pages.

Grand Central™ Communications website, retrieved Nov. 6, 2003, from http://www.grandcentral.com/products/, 2 pages.

Grand Central™ Communications, "Frequently Asked Questions," retrieved Nov. 6, 2003, from http://www.grandcentral.com/products/faqs/index_html, 5 pages.

InformationWeek, "Amazon EC2 Lets Users Sell Software As A Service," Aug. 1, 2007, retrieved Oct. 13, 2007, from http://www.informationweek.com/shared/printableArticleSrc.jhtml?articleID=201202196, 1 page.

Irani, "Web Services Intermediaries—Adding Value to Web Services," Nov. 21, 2001, retrieved Aug. 2, 2005, from http://www.webservicesarchitect.com/content/articles/irani07print.asp, 5 pages.

Jamcracker, Inc., "Jamcracker announces Pivot Path: Fully integrated software suite for Identity Management," Nov. 11, 2003, retrieved Sep. 12, 2005, from http://web.archive.org/web/20040607054618/http://jamcracker.com/pivot_path_release.pdf, 2 pages.

Khare, "Whiz-Bangery, Indeed: Primordial's WSBANG," Nov. 16, 2001, retrieved Sep. 9, 2005, from http://lair.xent.com/pipermail/fork/2001-November/006569.html, 2 pages.

Lee, "StrikeIron's Hot for Web Services," *SD Times*, Jun. 1, 2004, retrieved Sep. 12, 2005, from http://www.strikeiron.com/doc/SDTimes060104.pdf, 1 page.

Levitt, "From EDI to XML and UDDI: A Brief History of Web Services," Oct. 1, 2001, InformationWeek, retrieved Sep. 9, 2005, from http://www.informationweek.com/story/IWK20010928S0006, 3 pages.

Leymann, "Web Services Flow Language (WSFL 1.0)," IBM Software Group, May 2001, 108 pages.

Oasis, "UDDI.org," retrieved Sep. 8, 2005, from http://www.uddi.org/find.html, 2 pages.

PayPal.com, "Recurring Billing Service: How It Works," retrieved Dec. 5, 2006, from http://www.paypal.com/cgi-bin/webscr?cmd=_payflow-recurring-billing-integration-outside, 2 pages.

PayPal.com, "Recurring Billing Service: FAQs," retrieved Dec. 5, 2006, from http://www.paypal.com/cgi-bin/webscr?cmd=_payflow-recurring-billing-faq-outside, 3 pages.

Radding, "Generating Revenue from Web Services—Six Vendors With the Right Tools," Jan. 20, 2003, retrieved from http://72.14.207.104/search?q=cache:W5EXBA4Lr54J:home.comcast.net/~alanradding/iaws.pdf+generating+revenue+from+web+services+radding&hl=en&gl=us&ct=clnk&cd=3, 4 pages.

Redhat.com, "Red Hat Announces Red Hat Enterprise Linux Available On Demand on Amazon Elastic Compute Cloud," Nov. 7, 2007, retrieved Nov. 19, 2007, from http://www.redhat.com/about/news/prarchive/2007/amazon.html, 3 pages.

Sabre Travel Network, "Sabre Travel Network Launches Web Services Capabilities for Agents," Jul. 28, 2003, retrieved Sep. 13, 2005, from http://phx.corporate-ir.net/phoenix.zhtml?c=73098&p=IROL-NewsText&t=Regular&id=435603&logo=logo03, 2 pages.

SalCentral, "Subscription of Web Services," Oct. 5, 2003, retrieved Sep. 7, 2005, from http://web.archive.org/web/20031005075820/www.salcentral.com/salnet/wpsubws.htm, 5 pages.

SalCentral, "The Napster of Web Services," Oct. 4, 2003, retrieved Sep. 7, 2005, from http://web.archive.org/web/20031004143406/www.salcentral.com/salnet/webservicesnapster.asp, 2 pages.

SalCentral, "WSDL, SOAP and Web Services and Quality Assurance and Promotion," Oct. 4, 2003, retrieved Sep. 7, 2005, from http://web.archive.org/web/20031004143940/www.salcentral.com/salnet/webservicewhat.asp, 2 pages.

SalCentral, "WSDL, SOAP, Web Services Search Engine and Web Service Tracking," Oct. 11, 2003, retrieved Sep. 7, 2005, from http://web.archive.org/web/20031011101544/www.salcentral.com/salnet/webserviceswsdlne.asp, 1 page.

Samtani et al., "Integration Brokers and Web Services—Will Web Services Support Be Just Another Feature?" Jan. 30, 2002, retrieved Aug. 2, 2005, from http://www.webservicesarchitect.com/content/articles/samtani03print.asp, 5 pages.

Schofield, "The Third Era Starts Here," *The Guardian*, May 29, 2003, retrieved Nov. 4, 2003, from http://www.guardian.co.uk/print/0,3858,46784410-110837,00.html, 3 pages.

Siddiqui, "UDDI Based Electronic Marketplaces—Easier Integration With UDDI and WSDL," Feb. 20, 2002, retrieved Aug. 2, 2005, from http://www.webservicesarchitect.com/content/articles/siddiqui02print.asp, 4 pages.

Sirin et al., "Semi-automatic Composition of Web Services using Semantic Descriptions," *Web Services: Modeling, Architecture and Infrastructure Workshop in ICEIS 2003*, Angers, France, Apr. 2003, from http://www.mindswap.org/papers/composition.pdf, 6 pages.

Smith, "Striking While the Iron is Red Hot: StrikeIron Unveils Its Web Network," LocalTechWire, Jun. 25, 2004, retrieved Sep. 22, 2005, from http://www.localtechwire.com/article.cfm?u=8509, 3 pages.

SoftwareMarkets.com, "Frequently Asked Questions from Developers," Sep. 18, 2000, retrieved Sep. 8, 2005, from http://web.archive.org/web/20000918003355/www.softwaremarkets.com/info/faqdevs.html, 3 pages.

Sterling Commerce, "Sterling Information Broker," retrieved Nov. 10, 2003, from http://www.sterlingcommerce.com/PDF/Solutions/Sterling/SC0040.InfoBrokerOver.6-02.pdf, 4 pages.

Sterling Commerce, "Sterling Information Broker," retrieved Nov. 10, 2003, from http://www.sterlingcommerce.com/solutions/em/commerce/iibs.html, 3 pages.

StrikeIron, Inc., "StrikeIron Launches the Web Services Business Network," Jun. 23, 2004, retrieved Sep. 8, 2005, from http://www.strikeiron.com/news/si_launches.aspx, 3 pages.

StrikeIron, Inc., "StrikeIron Web Services Business Network™ Overview," retrieved Sep. 12, 2005, from http://www.strikeiron.com/doc/StrikeIronWebServicesBusinessNetworkOverview.pdf, 24 pages.

StrikeIron, Inc., "Frequently Asked Questions," retrieved Dec. 5, 2006, from http://www.strikeiron.com/info/faqs_p.aspx, 5 pages.

StrikeIron, Inc., "What is Invoke Through Compensation," retrieved Dec. 5, 2006, from http://www.strikeiron.com/info/whatisinvokethrough.aspx, 3 pages.

Taft, "Start-Up Presents ASP Opportunity for Java Developers," *CRN*, Jul. 31, 2000, retrieved Sep. 20, 2005, from http://www.crn/sections/breakingnews/breakingnews.jhtml?articleId=18834381, 3 pages.

Tolksdorf et al., "A Web Service Market Model Based On Dependencies," retrieved Sep. 9, 2005, from http:www.wiwiss.fu-berlin.de/suhl/bizer/pub/p49-tolksdorf.html, 4 pages.

UNISYS, "Web Service Marketplace," retrieved Nov. 4, 2003, from http://www.unisysfsp.com/default.aspx?catID=16, 2 pages.

W3C, "WS Choreography Model Overview," Mar. 24, 2004, retrieved Sep. 8, 2005, from http://www.w3.org/TR/2004/WD-ws-chor-model-20040324, 35 pages.

Waldspurger et al., "Spawn: A Distributed Computational Economy," May 1989, Xerox Palo Alto Research Center, 32 pages.

Web Services Architect, "Web Services Resources," retrieved Nov. 6, 2003, from http://webservicesarchitect.com/resources.asp, 6 pages.

(56) References Cited

OTHER PUBLICATIONS

WestGlobal mScape™, "Web Services Business Management System," retrieved Nov. 7, 2003, from http://www.westglobal.com/downladable_media/mscape_literature.zip, 20 pages.
Westglobal, "Products—Overview," retrieved Nov. 7, 2003, from http://www.westglobal.com/products/mscape_overview.htm, 3 pages.
Westglobal, "Products—Revenue Management Module," retrieved Nov. 7, 2003, from http://www.westglobal.com/products/mscape revman.htm, 3 pages.
Xmethods website, retrieved Nov. 6, 2003, from http://www.xmethods.net/, 3 pages.
ZapThink, LLC, "ZapThink Briefing Note," Oct. 8, 2002, retrieved Nov. 7, 2003, from http://www.grandcentral.com/assets/docs/GC.zapthink_report.pdf, 5 pages.

\* cited by examiner

This service will allow anyone with a CSSIUF account to be billed for use of your software image. On this page, please provide information about your software image. — 201

Product Information

Please provide the information below. This is exactly what your customers will see when they purchase your software image.

Company Name: [ ]
Product Name: [ ] — 203

Product Description
*(Please enter plain text only)* [ ] — 205

Redirect URL:
*(Please provide the URL that you would like to direct your customers to after they have provided us with their billing information)* [http://] — 207

---

Terms and Conditions (*Optional*)

If you wish, we can require all customers to agree to Terms and Conditions that apply to the use of your product before they purchase your product. If you would like to present Terms and Conditions, please enter them below. Otherwise, just leave this field blank. (*Please enter plain text only*) — 209

[ ]

Contact Information

Please provide your contact information for product related issues.

Contact email address: [ ]
Contact telephone number: [ ] — 211
Email address or URL for customers with product or technical inquiries: [ ]

Fig. 2A

Provide Pricing Information for Software Image AAA

Please follow these steps to define Software Image AAA pricing:

1. Define the price you will charge for the dimensions on which services used by the software image are charged. For instance, if Software Image AAA uses software image execution service EEE, you will define a price for:
*CPU-Hour of execution used, and GB of data transferred in and out.*

2. Optionally define a fixed, one-time fee, and/or monthly recurring fee.

Please define the prices in the tables below. On the next screen, you will be able to review the net proceeds you would obtain given the pricing defined below.

STEP 1: Software Image AAA for software image execution service EEE

| Pricing Use Dimension & Amount Of Use | Software Image AAA Price | Service EEE Price | Optional Explanation of Pricing Dimension (e.g. This is approximately 200 MP3s stored for a month) |
|---|---|---|---|
| CPU-Hour of execution used | $0.15 | $0.10 | |
| GB of data transferred in | $1.00 | $0.10 | |
| GB of data transferred out | $0.18 | $0.18 | |

STEP 2: Optional Software Image AAA Monthly and/or One-Time Fees

| | Pricing Use Dimension | Software Image AAA Price | Optional Explanation of Pricing Dimension (e.g. This is a recurring monthly fee) |
|---|---|---|---|
| ☐ | Monthly Fee | $0.00 | |
| ☑ | One-Time Fee | $10.00 | |

Click *Continue* to review Software Image AAA pricing. [Continue ▶]

Fig. 2C

233 — Review Pricing Information for Software Image AAA

The table below explains Software Image AAA net proceeds given the prices you entered and charges for each pricing use dimension of each service consumed by your users. Please review it and press the *Change* buttons if you want to amend your pricing.

Software Image AAA Price for Service EEE Pricing Use Dimensions  [Change]

235:

| Pricing Use Dimension | Software Image AAA Price | − Service EEE Price | − CSSIUF Charges (what's this?) | = Software Image AAA Net Proceeds (what's this?) |
|---|---|---|---|---|
| CPU-Hour of execution used | $0.15 | $0.10 | $0.005 | $0.045 |
| GB of data transferred in | $1.00 | $0.10 | $0.09 | $0.81 |
| GB of data transferred out | $0.18 | $0.18 | $0.00 | $0.00 |

Optional Software Image AAA Monthly and/or One-Time Fees  [Change]

237:

| Pricing Use Dimension | Software Image AAA Price | − CSSIUF Charge (what's this?) | = Software Image AAA Net Proceeds (what's this?) |
|---|---|---|---|
| One-Time Fee | $10.00 | $1.00 | $9.00 |

Review the information below, then click "Place your order."

Product Information

Software Image AAA

Software Image AAA provides editing capabilities for most types of images, including photos, and can access images that are stored locally on your computer or in a network storage service.

Pricing

- $0.15 per CPU-Hour of execution used
  Most standard image editing operations take only a couple of minutes.
- $1.00 per GB of data transferred in
  This is equivalent to approximately 500 typical photos.
- $0.18 per GB of data transferred out
- $10.00 One-time charge
  A one-time charge for the use of the Software Image AAA.

Note: CSSIUF will charge for your use of Software Image AAA on the 1st of every month.

Total due today — 313

| | |
|---|---|
| Recurring Monthly charge: | $0.00 |
| One-time charge: | $10.00 |
| Total: | $10.00 |

Payment Method: [Change]
Visa: ***-11111
Exp: 02/2010

Billing Address: [Change]
John Smith
1111 1st St.
Seattle, WA 98144
United States
Phone: 1 (202) 555-1111

● Place your order

Terms and Conditions — 315

☐ Check here to indicate that you have read and agree to the terms of (1) <u>CSSIUF Licensing Agreement</u>, (2) <u>the Software Image AAA terms of use</u>, and (3) <u>software image execution service EEE terms of use</u>.

Review the information above, then click "Place your order."

● Place your order — 317

*Fig. 3C*

PROVIDING CONFIGURABLE PRICING FOR EXECUTION OF SOFTWARE IMAGES

TECHNICAL FIELD

The following disclosure relates generally to facilitating sharing of executable software images between users, such as by enabling creators of executable software images to configure fees to be charged to other users who execute those software images.

BACKGROUND

Data centers housing significant numbers of interconnected computing systems have become commonplace, such as private data centers that are operated by and on behalf of a single organization, and public data centers that are operated by entities as businesses to provide computing resources to customers. For example, some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine. Each such virtual machine may be a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

In addition, various mechanisms exist to allow computers and executing software applications to interact, including to remotely interact with software executing in a data center. For example, remote procedure call ("RPC") protocols have long existed that allow a program on one computer to cause a program on another computer to be executed. In a similar manner, various object-oriented architectures such as CORBA ("Common Object Request Broker Architecture") and DCOM ("Distributed Component Object Model") provide remote execution capabilities. In addition, various middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via Web browser applications executing on user computers) and receiving the requested information in response. In addition, there is also growing use of the Web to support the programmatic interaction of remote applications to exchange information via defined APIs ("application program interfaces"), such as via Web services. Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

While the availability of data centers and virtualization technologies has provided various benefits, various problems still exist. For example, it is often difficult for a user to create and manage the execution of software programs that provide desired functionality at a remote location such as a data center, particularly when the data center uses virtualization technologies.

BRIEF DESCRIPTION OF THE DRAWINGS

FIGS. 2A-2D illustrate examples of interactions between software image creators and an embodiment of a system that enables configuration of use of shared software images by others.

FIGS. 3A-3D illustrate examples of interactions between end users and an embodiment of a system that enables the end users to obtain access to shared software images in accordance with configuration information specified for the shared software images.

DETAILED DESCRIPTION

Figure 1A:
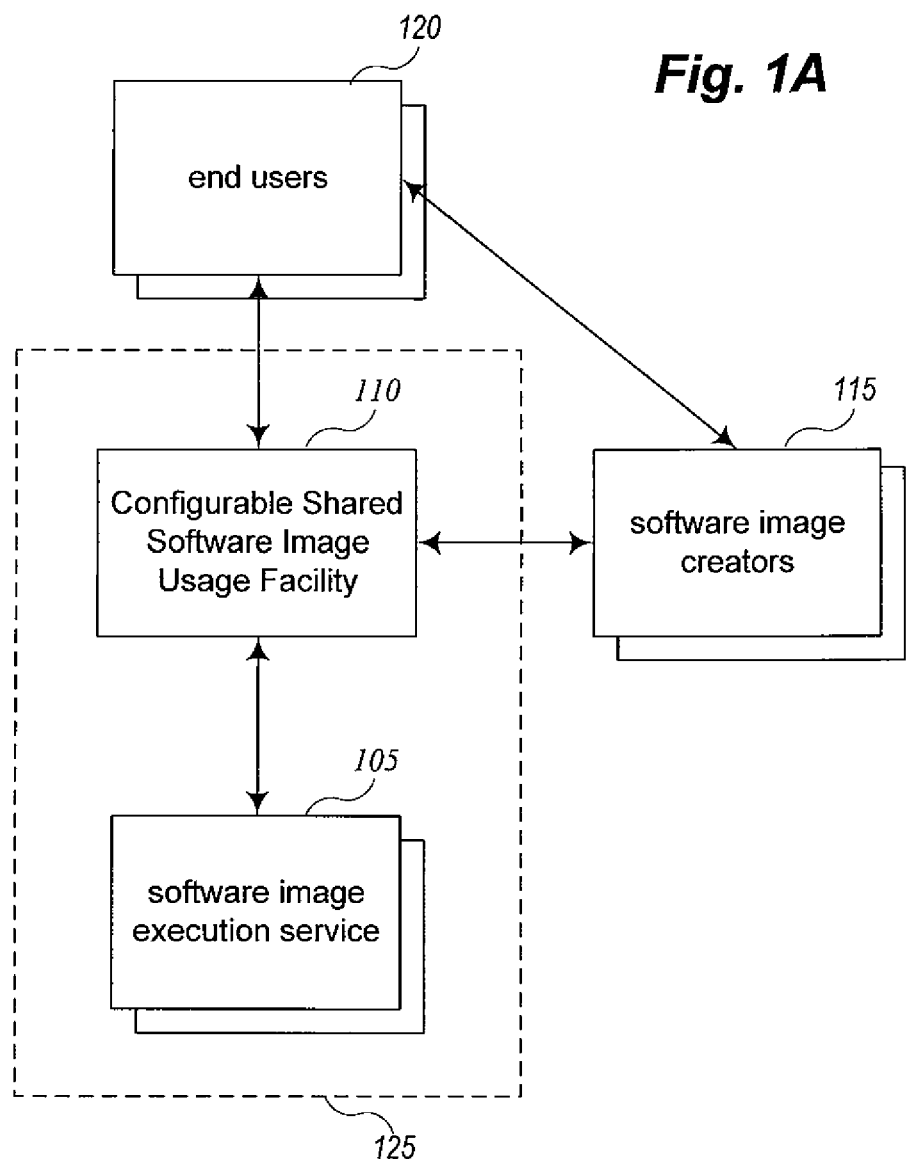
FIGS. 1A-1C illustrate examples of interactions to facilitate sharing of user-created executable software images in a configurable manner.

Techniques are described for facilitating sharing of executable software images between users in a configurable manner. In at least some embodiments, at least some of the shared executable software images are made available in a fee-based manner by creator users who create the software images, such that execution of such a fee-based software image by a software image execution service on behalf of a user other than the creator user is performed in exchange for fees from the other user as defined by the creator user. The creator user may further receive at least some of the fees paid by the other user in at least some embodiments and situations, such as at least some of a difference between the fees paid by the other users and fees charged by the software image execution service for the execution. In addition, in at least some embodiments, the executable software images are virtual machine images (e.g., images that are bootable or otherwise loadable by a virtual machine and that each include operating system software and/or software for one or more application programs), and the executing software images may in at least some embodiments and situations access and use remote network-accessible services (e.g., Web services) while executing. Additional details related to facilitating the sharing of executable software images between users are included below. In addition, in at least some embodiments, the described techniques are automatically performed by a Configurable Shared Software Image Usage Facility ("CSSIUF") system, as described in greater detail below.

In particular, at least some embodiments, a user associated with a software image (e.g., a software image developer user or other software image creator user that is involved in creation of the software image) may interact with an embodiment of the CSSIUF system to configure pricing and other information for use of the software image by other users. To perform the configuration for a software image, in at least some embodiments, a software image creator user interacts with the CSSIUF system to select one or more services that the software image will use when executing, and interactively configures a usage model for each selected service to correspond to use of the service by the executing software image. For example, the CSSIUF system may have access to information about one or more software execution services that execute software images (or other software programs) for users, such as to have information about pricing terms that the software execution service uses to charge users for executing software on behalf of the users and/or about other terms related to use of the software execution service (e.g., terms and conditions). The CSSIUF system may have access to such information about software execution services in various ways, such as if the CSSIUF system is integrated with or otherwise provided in conjunction with a particular software execution service, if one or more third-party software execution services have registered with the CSSIUF system to provide such information, etc. In addition, in some embodiments, one or more other types of services may be used by a software image when executing and may be similarly configured via the CSSIUF system, such as Web services or other remote network-invocable services that are accessed by the executing software image.

A configured usage model that is specified by a user for a selected service may include a variety of pricing terms and other information related to use of the service. For example, a software execution service may define pricing terms for execution of a software image for a user that are based on an indicated amount of use of one or more use dimensions (e.g., an indicated price for each use of the service; an indicated price per amount of time of use; an indicated price per unit of processing time; an indicated price per unit of storage used; an indicated price per unit of data transferred in; an indicated price per unit of data transferred out; an indicated price for a predetermined number of times of use in a predetermined period of time, etc.), such as to reflect an amount of computing resources used by the software image when executing. If so, the configured usage model for execution of a particular software image via that software execution service may include one or more configured indicated prices that are each for a configured indicated amount of use of a configured indicated use dimension (e.g., to specify different configured prices for the same amount of use of the same use dimension, such as higher configured prices; to specify configured prices for one or more new custom use dimensions that are not used by the software execution service; to specify configured prices for a different amount of use of the same use dimension; etc.). Furthermore, in at least some embodiments, the configured prices for execution of a software image by a selected software execution service include a configured price for each use dimension for which the underlying selected software execution service charges a fee (e.g., for each use dimension, a configured price for that use dimension that matches or exceeds the price charged by the selected software execution service for that use dimension), while in other embodiments the configured prices of the usage model may not include a configured price for each such use dimension (or may include a configured price lower than the corresponding price charged by the underlying selected software execution service), such that an end user may pay fees for use dimensions having a configured use price in the configured usage model, and such that the software image creator may pay fees for other use dimensions for which the underlying selected software execution service charges a fee but the configured usage model does not.

In addition, the configured usage model for executing a particular software image via a particular software execution service may further include other types of criteria or other information in at least some embodiments, such as access criteria to control which other users are allowed to execute that software image via that software execution service (e.g., to indicate that all other users are allowed, to indicate particular users that are allowed and/or excluded, to indicate groups of users that are allowed and/or excluded, to indicate characteristics of users that are allowed and/or excluded, etc.) and/or to indicate conditions under which execution of that software image is allowed or not allowed (e.g., conditions related to day and/or time, conditions related to a type of use of the executing software image, etc.). As one specific example, a user who interacts with the CSSIUF system to configure pricing and other information for a shared software image may be part of or otherwise represent an organization or other entity, such as an entity with which multiple users are associated. In such situations, the user may, for example, configure information for the shared software image that allows access to the software image to some or all of the multiple associated users but not to some or all other users (or instead may configure pricing information such that the associated users pay less than other users for use of the shared software image, such as by not charging any fee for some or all of the associated users to use the shared software image while other users are charged a fee).

After a software image creator user has configured a usage model for execution of a software image by a selected software execution service, and optionally one or more other usage models for use of other selected services, the software image may be made available to end users in various ways. In some embodiments, the software image creator user (or alternatively the CSSIUF system) provides the software image to the selected software execution service for storage, or otherwise stores the software image in a storage location accessible to the selected software execution service. In this manner, other users may send a request to the selected software execution service to initiate execution of the software image (e.g., along with a unique image identifier corresponding to the stored software image), and the selected software execution service may access the stored software image to initiate such execution of a copy of the software image. In addition, in some embodiments, the software image creator user (or alternatively the CSSIUF system) associates the one or more configured usage models with the software image in various ways, such as by receiving a software image key from the CSSIUF system and supplying it to the selected software execution service to be associated with the stored software image, as discussed in greater detail below. In this manner, the selected software execution service may use the software image key associated with a software image to report execution of that software image to the CSSIUF system. In other embodiments, an end user may initiate execution of a software image in other manners, such as by acquiring the software image (e.g., from the creator user who created the software image) and providing it to the selected software execution service for execution.

In addition, in some embodiments, before an end user executes a copy of a software image via a selected software execution service, the end user first subscribes to the use of the software image. In particular, the end user may be directed to interact with the CSSIUF system to perform the subscription, which may include providing payment information for fees to be charged to the end user, as well as optionally providing other information to the CSSIUF system (e.g., end user contact information, an indication of assent to any specified use terms and conditions for the software image and/or the selected services, etc.). The end user may be directed to interact with the CSSIUF system at various times and in various ways in various embodiments, including when the end user first attempts to initiate execution of the software image at a selected software execution service (e.g., by being directed by the software execution service), when the end user is first purchasing access to or otherwise acquiring the software image, when the executing software image first attempts to use a selected service on behalf of the end user, etc. In addition, in some embodiments, the end users may be charged recurring fees (e.g., monthly fees) and/or one-time fees (e.g., setup fees) as part of a subscription. The recurring and/or one-time fees may be charged in advance (e.g., at a beginning of a month for which a monthly fee corresponds) and/or periodically after use has occurred (e.g., at the end of a month for any use in excess of a standard monthly charge during that month). Accordingly, an end user subscription may in some embodiments and situations be for recurring use of a software image and one or more selected service(s) (e.g., a monthly subscription that is automatically renewed unless otherwise specified), while in other situations may be for other types of use (e.g., for a single use, for use for only a limited specified time, for use for only a limited number of times, etc.).

After an end user subscribes to use an indicated software image, in at least some embodiments the end user is provided with information for use with the software image execution. For example, in some embodiments, the software image execution service may have access to a stored copy of a shared software image, and that shared software image may be associated with one or more configured usage models corresponding to pricing for use of the shared software image (e.g., by associating one or more software image keys with the shared software image, with the software image keys being associated with the configured usage models). If so, the end user may merely be provided with an image identifier corresponding to the shared software image, to be supplied by the end user to the software image execution service along with identifying information about the end user in order to initiate execution of the shared software image on behalf of the end user. The software image execution service then uses the supplied image identifier to identify the software image to execute for the end user, such as after the software image execution service interacts with the CSSIUF system to verify that the end user is authorized to execute the shared software image. An image identifier may have various forms in various embodiments, such as a random alphanumeric string associated with the end user.

In some embodiments, a selected software execution service may further be provided with a user token that includes information to use to determine authorization of an end user to execute a software image, whether directly from the CSSIUF system after user subscription to the software image, or from the end user when he/she supplies that user token to initiate execution of the software image (e.g., by supplying the user token to a selected software execution service so that it will execute the software image on behalf of the user, by supplying the user token to the execution software image as it begins to execute, etc.). In other embodiments, a user token may be associated with a software image copy in other manners, such as if other software stores the user token and supplies it when appropriate for use with that software image copy. The user token may have various forms in various embodiments, such as a random alphanumeric string associated with the end user, or an alphanumeric string that includes various information about the end user (e.g., an indication of the end user name and/or unique identifier, an indication of a software image key for the software image with which the user token may be used, an indication of a creation time and a subsequent time-to-live value during which the end user may use the user token, etc.) and that may be encoded to protect the included information (e.g., by being encrypted, by being the result of a one-way hash, etc.). A user token (or other user information based on the user token, such as a user credential, discussed below) may be used in various ways in various embodiments, such as by a selected software execution service to verify that the end user is authorized to execute an indicated software image (e.g., based on information stored as part of the user token, based on an interaction with the CSSIUF system to verify the user token for the indicated software image, etc.), or by including the user token/information as part of a call by the executing software image copy to invoke or request access to a selected invocable service.

When the CSSIUF system obtains a user token or other information about a user (e.g., based on an initial interaction initiated by a software execution service when initiating execution of a software image, based on a subsequent interaction initiated by a software execution service to report execution of a software image that has been completed or is ongoing, as part of the use of a selected invocable service, etc.), the user information may be used by the CSSIUF system to identify the end user on whose behalf the service use occurred (and if the user tokens are specific to the software images with which they are used, to identify the software image that used the service), and to track the use by that end user. When appropriate (e.g., once a month, for each service usage, etc.), the payment information specified by the end user may be retrieved and used for providing payment for use of the service via the executing software image, such as based on the configured usage model for the software image and selected service.

As one particular example of end user interaction with the CSSIUF system, in some embodiments a creator of a software image with one or more configured usage models for selected services receives a reference to the CSSIUF system to be used to facilitate subscriptions by end users (e.g., an Internet URL that directs an end user to the CSSIUF system), while in other embodiments a selected software execution service may receive the reference. When an end user requests to initiate execution of, purchase, subscribe to or otherwise acquire access to the software image (e.g., by interacting with a Web site of the software image creator, by interacting with a Web site or other information store associated with a selected software execution service, etc.), the end user is directed to the CSSIUF system to complete the subscription process and receive an image identifier for use in executing the software image. In some embodiments, when a selected software execution service and/or executing software image copy receives a user token or other information about an end user, it interacts with an embodiment of the CSSIUF system to obtain a user credential based on the user token (e.g., a public key certificate or identity certificate, such as an X.509 certificate based on the Internet Engineering Task Force's Public-Key Infrastructure X.509 standard), such as by supplying the user token and other information related to an identity of the end user and/or a computing device of the end user on which the software image copy will be executed. After such a user credential is obtained from the CSSIUF system, it is then stored by the executing software image copy, and used to make service invocation calls or other requests to obtain access to selected invocable services. As previously noted, in some embodiments such user credentials may have a limited time-to-live, such that the end user, selected software execution service and/or executing software image copy may need to periodically obtain new user certificates from the CSSIUF system. Furthermore, in some embodiments a user credential may include additional information, such as information about use restrictions (e.g., that service invocations based on the user credential may occur only at certain times, only at certain volumes, etc.), which may then be enforced by the CSSIUF system, selected software execution service, executing software image copy and/or selected invocable services. In addition, in some embodiments the user credential is used to associate an executing software image copy, end user and end user's computing device together, such that access to some or all of the functionality of the executing software image copy may be available only to the end user and only on the end user's computing device.

In addition, in some embodiments, after a software image creator user has configured a usage model for each of one or more selected services for a software image, the CSSIUF system provides the software image creator user with a software image key (e.g., an alphanumeric string) for use with the software image in order to facilitate tracking of the use of services by the software image, while in other embodiments the software image creator user may instead select the software image key and provide it to the CSSIUF system (e.g., for use in situations in which the software image creation is completed and the software image is already configured to use a particular software image key).

For example, the selected software execution service may provide reports to the CSSIUF system at various times to indicate execution of a software image associated with a supplied software image key. In addition, the software image key may be used when an executing copy of the software image makes use of one of the selected invocable services, such as by including the software image key when an executing copy of the software image makes a call to invoke or request access to one of the selected invocable services. When the software image key is received by the CSSIUF system as part of the use of a selected service, the software image key may be used by the CSSIUF system to identify the software image that used the service, and to track the use by that software image. When appropriate (e.g., once a month, for each service usage, etc.), the configured usage model specified for use of the service by the software image may be retrieved, and appropriate pricing terms may be determined from the configured usage model in order to determine fees to be charged an end user of the executing software image copy for the use of the service.

Thus, both a software image key and a user token (or a user credential based on one or both of them) may be supplied by a software image when initiating execution of a software image by the software execution service on behalf of an end user and/or when accessing invocable services on behalf of an end user. The use of the one or more selected services on behalf of an end user is then metered (e.g., by tracking use based on the software image key and/or the user token or credential) by the CSSIUF system or by an associated system, so that the end user may be charged appropriate fees for the use according to the configured usage model specified by the software image creator for the software image. The revenue collected based on the end user's use of the one or more selected services may be subsequently split between the software image creator and the one or more service providers of the selected services, such as if the configured usage model results in fees charged to the end user that are greater than fees charged by the providers of the selected services. In some embodiments, if payment is not obtained from the end user for the use of selected services, the software image creator does not receive corresponding payment, but in some embodiments is also removed by the CSSIUF system of liability for fees charged by the providers of the services for that use (and thus does not owe any money to the service providers for use of the services via the indicated software image). In other embodiments, liability may not be removed in certain situations, such as if a software image creator configures a use price for a selected service that is less than the use price associated with the selected service (or liability may be removed for only a portion of the use price associated with the selected service, such as the use price configured by the software image creator), if the software image creator specifies a configured use price based on a use dimension that is not used by the selected invocable service, etc. Furthermore, in some embodiments and situations, the CSSIUF system may provide authentication functionality, such as in response to a request from an executing copy of a software image to access a particular selected service on behalf of an end user. The authentication functionality may include determining whether the software image and end user are authorized to access the particular selected service, such as by retrieving information regarding any configured usage models for the software image and any subscription information for the end user, and/or by using information encoded in and/or associated with a received user credential or user token.

In some embodiments, selected services may further charge fees for their use based on multiple different use aspects (e.g., by specifying use prices with respect to multiple use dimensions). For example, an invocable storage service may charge fees based on the amount of data stored (e.g., with a first indicated price per megabyte of data) and on the number of times that storage and/or retrieval access occurs (e.g., with a second indicated price per access). Similarly, a software image creator user may configure pricing terms that correspond to multiple use dimensions for a selected service, whether based on the same multiple use dimensions as specified by the selected service or not (e.g., by adding a use price for a second use dimension when the underlying selected service specified a price for only a single use dimension). If a software image creator user specifies one or more custom use dimensions for a selected service that differ from the use dimensions specified by the service, the software image may further in some embodiments provide information to the CSSIUF system during software image execution to specify how much usage has occurred with respect to those custom use dimensions. In addition, when a software image execution service or other selected service changes how fees are charged for its use by an executing software image (e.g., by changing the price charged for a particular amount of use with respect to a particular use dimension, by specifying a new use dimension for which prices will be charged, etc.), such changes may be handled in various ways in various embodiments with respect to shared software images that already have configured usage models based on the prior pricing information. For example, in some embodiments and situations, the prior pricing information for the software image execution service or other selected service may continue to be used for such shared software images that have configured usage models based on the prior pricing information, at least for a limited time. In other embodiments and situations, such changes in pricing information for a software image execution service or other selected service may be handled in other ways, such as by allowing only new configured usage models based on the changed pricing information to be used for shared software images (e.g., by disallowing use based on subscriptions using older configured usage models based on the prior pricing information), or by charging for use by the software image of the software image execution service or other selected service at the new prices even if the already existing configured usage models are based on the old pricing information.

In addition, in some embodiments the CSSIUF system may charge various fees for the functionality that it provides. For example, the CSSIUF system may charge a fee to a software image creator for providing capabilities to allow the software image creator to specify one or more configured usage models for selected services, for providing capabilities to meter usage of selected services and obtain corresponding payment from end users, for providing capabilities to pay service providers for use of their services based on corresponding payments received from end users, etc. Furthermore, the fees charged may have various forms, such as a predetermined percentage (e.g., 10%) of the proceeds after paying service provider(s) for use of their service(s), a predetermined amount for each service (e.g., $0.50), etc., or a combination thereof. Additional details related to configuring prices and allocating fees between software image creators or other software image providers, service providers, and a configuration facility are included in U.S. patent application Ser. No. 11/618,469, filed Dec. 29, 2006 and entitled "Providing Configurable Pricing For Use Of invocable Services By Applications;" in U.S. patent application Ser. No. 11/618,480, filed Dec. 29, 2006 and entitled "Using Configured Application Pricing To Determine End User Fees For Use Of Invocable Services;" and in U.S. patent application Ser. No. 11/618,486, filed Dec. 29, 2006 and entitled "Providing Configurable Use By Applications Of Sequences Of Invocable Services;" each of which is hereby incorporated by reference in its entirety.

As previously noted, the described techniques may be used in various manners in various embodiments. For example, the CSSIUF system may be used with various types of software images, such as a software image that provides server-based capabilities that may be programmatically accessed by one or more remote client applications, a software image that an end user may interactively use via a graphical user interface of a client application (e.g., desktop applications or Web applications) executing on a client computing device of the end user, a command-line interface (e.g., for a system utility), etc. Similarly, the invocable services may be of various types, including, but not limited to, Web services, storage services, indexing services, and queuing services. In addition, some or all of the invocable services may be provided by an entity providing the CSSIUF system and/or by third-party service providers.

In addition, in at least some of the embodiments described above, a software image creator user configures a usage model for execution of a software image by a selected software execution service, and optionally one or more other usage models for use of other selected services, and those configured usage model(s) are used to determine the fees paid by end users who execute the software image via the selected software execution service. In other embodiments, users other than a creator of a software image may configure one or more usage models for the software image and/or a user may configure one or more usage models that are not specific to a particular software image. For example, a particular user may decide to make one or more types of fee-based functionality available to users who execute software images, such as support services for one or more indicated software images and/or for any software image. If so, such a third-party user may configure one or more usage models in a manner similar to that described for a creator user, although in some embodiments without indicating a particular software image and/or selected service. The third-party user may then obtain a functionality key associated with those configured usage model(s), and provide information to users in various ways (e.g., advertisements) about the fee-based functionality provided by the third-party user, including to provide the associated functionality key. An end user may then elect to obtain the fee-based functionality during execution of a software image by indicating to associate the functionality key with the software image (e.g., at the beginning of execution of a software image, such as for the duration of that software image execution; with a software image more generally, such as continue to use the functionality key with future executions of the software image until otherwise notified; for a temporary time during execution of a software image, such as after execution has begun and at a time when the fee-based functionality is needed; etc.). If so, the selected software execution service and/or executing software image may similarly report use of the functionality key with a software image execution on behalf of an end user, so that the end user is charged an appropriate fee corresponding to the configured usage model(s) associated with the functionality key. In addition, the third-party user who provides the fee-based functionality may further be allowed to verify that a particular executing software image has the functionality key associated with the execution, or that the fee-based functionality has otherwise been selected for the executing software image (e.g., the end user has already paid fees associated with use of the fee-based functionality), so as to verify that the fee-based functionality is provided only to executing software images whose end users have paid for the fee-based functionality.

Furthermore, in at least some of the embodiments discussed above, a usage model is configured for a software image based at least in part on pricing to be charged by an underlying selected software execution service that will execute the software image (e.g., so as to configure pricing that exceeds the prices charged by the underlying selected software execution service). In other embodiments, users may also enhance existing software images (e.g., software images created by other users) in at least some situations by creating new enhanced software images based on the existing software images, such as by adding additional software and/or by integrating third-party fee-based functionality into the new software image that was not present for the underlying existing software image. If so, such enhanced image creator users may similarly configure one or more usage models for execution of such an enhanced software image by a selected software execution service (e.g., the same software execution service selected for the underlying existing software image or instead a different software execution service), such as based on the configured usage model(s) of the underlying existing software image on which the enhanced software image is based (e.g., by configuring one or more prices for the enhanced software image that exceed corresponding configured prices for the underlying existing software image). In such embodiments, when an end user executes such an enhanced software image, the end user is charged one or more fees that are determined based on the configured usage model(s) for the enhanced software image. Furthermore, the creator user for the underlying existing software image on which the enhanced software image is based may in at least some embodiments receive at least some of the fees charged to the end user of the enhanced software image, such as some or all of the fees corresponding to the configured usage model(s) for the underlying existing software image. Such relationships between the enhanced software image and the underlying existing software image may be determined in various ways, such as by associating distinct software image keys with the enhanced software image that correspond to the enhanced software image and the underlying existing software image, by associating the software image key for the underlying existing software image with the software image key for the enhanced software image so that the relationship is maintained, etc. In this manner, a hierarchy or sequence of two or more software images may be constructed such that each software image in the hierarchy/sequence other than the first is an enhanced software image that adds to the underlying existing software image on which the enhanced software image is based.

In other embodiments and situations, such enhanced software images based on existing software images may not be allowed, such as if the creator or other provider of an existing software image prohibits or restricts the ability of others to create enhanced software images based on the existing software images (e.g., via technological restrictions encoded in the existing software image, such as based on not allowing others to have root-level access privileges; via restrictions specified as part of a configured usage model for the existing software image and/or based on restrictions specified to a software image execution service, such as to be enforced by the CSSIUF system and/or the software image execution service; etc.). Similarly, in some embodiments, once pricing and/or other information from a configured usage model is associated with a shared software image (e.g., based on associating a software image key with the shared software image), the ability to modify or remove that associated information may be restricted or prohibited, such as to disallow users other than the shared software image creator to modify and/or remove that pricing information, or to instead disallow all users from modifying and/or removing that pricing information.

In addition, in at least some embodiments, pricing information and image identifiers may be associated with and used with software images in various other manners. For example, in some embodiments, a user may be allowed to subscribe to a group of multiple software images (e.g., multiple software images from a single creator user, multiple software images configured to execute in conjunction with each other, etc.), such that the user receives a single image identifier that corresponds to that group of software images. When the user later supplies the image identifier to a software image execution service, the user may be allowed to execute some or all of the multiple software images of that group based on that image identifier. Similarly, in some embodiments and situations, one or more software images may have multiple associated configured usage models (e.g., based on multiple software image keys being associated with the one or more software images) that each correspond to distinct pricing for use of the one or more software images, such that an end user who subscribes to such a software image may pay fees for using the software image that are based on a combination of the multiple configured usage models. Such multiple configured usage models may be supplied by a single user or by multiple users, and may be inter-related or independent of each other in various embodiments.

FIG. 1A illustrates an example of interactions in which software image creator users configure usage models for selected services to be used by their executing software images, and in which end users subsequently subscribe to use those software images. In this example, the selected services are one or more commercial fee-based software image execution services that execute software images on behalf of users. In particular, one or more service providers each offer a software image execution service 105 that is available to execute software images supplied by users, with each software image execution service having predefined pricing terms (not shown) specified with the Configurable Shared Software Image Usage Facility ("CSSIUF") system 110 that include an indicated use price for an indicated amount of use with respect to an indicated use dimension. In some situations, some or all of the providers of the software image execution services 105 may be the same entity that provides the CSSIUF system, with the CSSIUF system 110 and the providers' computing systems (not shown) being part of a group of systems 125 of that entity, while in other embodiments some or all of the software image execution service providers may be distinct from and external to the entity that provides the CSSIUF system.

After the pricing information for the software image execution services 105 are specified to the CSSIUF system 110, a software image creator user 115 interacts with the CSSIUF system to select one or more of the services 105 to use to execute a software image being created (not shown), and configures one or more usage models (not shown) for the selected services 105. After the usage model(s) are configured, the software image creator receives a software image key for use with the software image, as well as one or more URLs to use to direct end users to the CSSIUF system to perform subscription activities regarding obtaining access to the software image. The software image creator may associate the software image key with the software image in various ways, such as by configuring the software image to use the software image key when making requests to use other selected services, and/or by providing the software image to the selected software image execution service and associating the software image key with the provided software image.

After the software image creator 115 creates the software image and configures the usage models, an end user 120 may decide to execute the created software image, such as by purchasing or otherwise acquiring access to the software image by interacting with the software image creator's Web site (not shown) or in other manners (e.g., via a Web site of the selected software image execution service; via other Internet sites, such as a Web site associated with the CSSIUF system; etc.). The end user 120 then interacts with the CSSIUF system 110 to subscribe to use the created software image, such as by providing contact and payment information. The end user then receives a user token for use in initiating execution of the software image. After the user token is used to configure an executing copy of the software image, such as based on obtaining a corresponding user credential, the end user 120 may use the executing software image copy to obtain functionality provided by the execution.

Figure 1B:
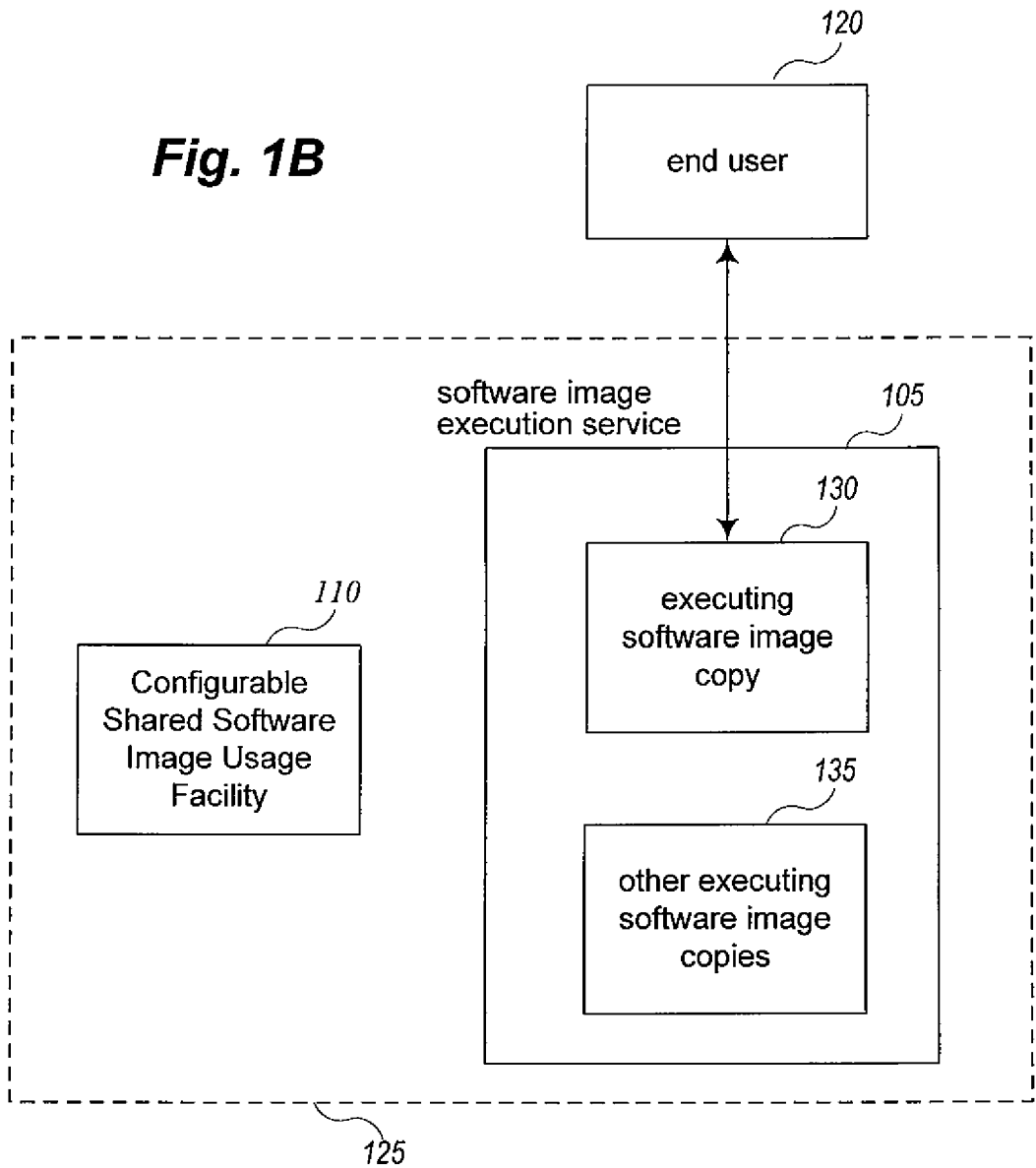

FIG. 1B illustrates an example of interactions between an end user, a software image copy executing via a selected software image execution service, and the CSSIUF system. In particular, in this example, an end user 120 is interacting with an executing software image copy 130, such as a software image created by one of the software image creator users 115 of FIG. 1A and provided to the end user by the one software image creator or other software image provider (e.g., the selected software image execution service 105 or other distributor of the software image). The software image copy 130 is associated with a software image key (not shown) based on prior configuration of one or more usage models via the CSSIUF system 110 for the software image, and has been configured based on a user token (not shown) for the end user in order to obtain a corresponding user credential, such as previously described with respect to FIG. 1A.

During execution, the software image copy 130 provides various functionality to the end user 120, and may further invoke one or more network-accessible services (not shown) on behalf of the end user. Prior to, during and/or after execution of the software image copy 130, the software image execution service 105 may interact with the CSSIUF system 110 to verify that the end user 120 is authorized to execute the software image and/or to allow the CSSIUF system to track an amount of use of the software image execution service by the executing software image copy, such as by sending to the CSSIUF system a received software image key associated with the software image, a user token and/or user credential for the end user, and an identifier associated with the software image execution service. Various additional information may be sent to the CSSIUF system as well, such as information regarding the amount of use of the service 105 with respect to one or more use dimensions specified in a predefined usage model for the service 105. Similarly, if the executing software image copy invokes a network-accessible service, the software image copy provides its software image key and the user credential to the network-accessible service, which may interact with the CSSIUF system to enable service usage tracking. In particular, in this example, when network-accessible services receive invocation requests from the software image copy, some or all of the network-accessible services may authenticate the requests by sending to the CSSIUF system the received software image key and user credential, as well as an identifier associated with the network-accessible service. If so, such network-accessible services may provide their capabilities to the software image copy only if the requests are authenticated by the CSSIUF system 110. If an invocation request of a network-accessible service is authenticated, or if such authentication is not performed, the network-accessible service may then perform a requested task and return results (not shown) to the executing software image copy. When the software image copy receives results from a network-accessible service, the results may be indicated to the end user or otherwise used by the software image copy as appropriate.

Furthermore, in at least some embodiments, any such network-accessible services used by the executing software image copy 130 may also interact with the CSSIUF system 110 to indicate the use of the network-accessible service by the executing software image copy 130 on behalf of the end user 120 (e.g., by providing the received software image key, received user credential, and service identifier), such as to enable service use metering capabilities of the CSSIUF system. Various information may be sent to the CSSIUF system by the network-accessible service, including information regarding the amount of use of the service with respect to one or more use dimensions specified in a predefined usage model for the service. In at least some embodiments, some or all of the network-accessible services may perform a single interaction with the CSSIUF system that enables both authentication and metering capabilities, such as before the service functionality is provided if the amount of use of the service that will occur can be determined in advance. In other embodiments, the CSSIUF system may provide metering capabilities by initiating communication with some or all of the network-accessible services and/or the software image execution service periodically to determine prior and/or current use of the service on behalf of the end user, such as to track the amount of storage that is currently used by an end user and software image copy for a storage service. In yet other embodiments, the software image copy may instead interact with the CSSIUF system (or an associated system acting as an intermediary) to invoke some or all of the network-accessible services. In those embodiments, authenticating may happen before the network-accessible service is invoked on behalf of the end user, and results may be returned to the software image copy via the CSSIUF system or directly to the software image copy by the network-accessible services.

Verification that an end user is authorized to execute the software image and/or authentication of an access request to an indicated network-accessible service by the software image copy on behalf of the end user may be performed in various ways in various embodiments. For example, verification or authentication may include verifying that the user credential (or user token) is currently valid, that the software image key is valid, and that use restrictions (if any) that are associated with or embedded with the user credential are satisfied. The verification or authentication functionality may further include retrieving information about the software image and end user to determine whether the access to the indicated service is authorized, such as by retrieving information regarding any configured usage models for the software image and any subscription information for the end user. In at least some embodiments, a user credential (or user token) may be revoked or expire for various reasons, such as the end user canceling a subscription to a software image, payment not being obtained for use of a service, a predefined life of the user credential being reached (e.g., based on a specified time-to-live value), etc. In those embodiments, software image execution access verification may occur each time that execution is initiated of a software image and/or periodically during execution of a software image, and service invocation authentication may occur each time that a network-accessible service is invoked. In other embodiments, some or all of the calls to a network-accessible service may not be individually authenticated (or may only be partially authenticated, such as by only verifying the user token or user credential), such as additional calls within a predetermined period of time to a particular network-accessible service from a single software image copy on behalf of the same end user, or for calls to the component service from a predetermined set of computing systems (e.g., based on their IP address). Similarly, some or all initiated executions of a software image may not be individually verified (or may only be partially authenticated, such as by only verifying the user token or user credential), such as subsequent execution initiations of a software image on behalf of a user within a predetermined period of time.

Various information about the use of an indicated service that is received by the CSSIUF system may be stored for later use in determining fees to be paid by end users for use of services by an executing software image copy. In at least some embodiments, the information may include the user credential (or user token), the software image key, an indication of the service used, and an indication of the amount of use of the indicated service with respect to an indicated use dimension. In addition, in at least some embodiments, a software image copy may interact with the CSSIUF system to provide metering information with regard to one or more use dimensions other than the predefined use dimensions of the service being used. If so, the use of the service with respect to the predefined use dimension may nonetheless be metered by the CSSIUF system, such as for use in determining fees to be paid to the service provider for the use of the service.

As previously mentioned, when appropriate (e.g., once a month, for each service usage, after a predetermined amount of fees are owed, when canceling a subscription, etc.), fees to be charged to an end user for the use of one or more services by one or more executing software image copies are determined. The determination of such fees may include retrieving information about the configured usage model(s) specified for use of the services by the software images. Other fees (e.g., recurring software image use fees, or fees paid by the end user to the CSSIUF system) may also be determined and added to the fees owed by the end user based on the service usage. Payment may be obtained using supplied payment information from the end user. If obtaining payment is not successful, in some embodiments various remedial actions are taken, such as contacting the end user to obtain alternative payment information and/or to prevent future access to use the services by the software image (e.g., by revoking the user credential or the user token so that it will no longer be authenticated or verified).

After receiving payment of fees from the end user, the CSSIUF system may allocate the fees received between the creator of the software image and the providers of the services used by the software image, and initiate payment of the allocated amounts to the parties. In some embodiments, the service provider for each service used by the software image is paid according to the use of the service by the software image on behalf of the end user (based on the predefined usage models for the services), and the software image creator is paid the remaining fees. In at least some embodiments, the CSSIUF system may also allocate at least some of the fees to itself for the functionality that it provides, and if so the net proceeds received by the software image creator and/or service providers may be reduced appropriately.

In at least some embodiments, a software image creator or provider user associated with a software image may also interact with the CSSIUF system to monitor (e.g., in substantially real-time) use of services by one or more executing copies of the software image and/or to monitor fees to be paid to the software image creator/provider user. Similarly, in at least some embodiments, an end user may interact with the CSSIUF system to monitor use of a software image on behalf of the end user and/or use of invocable services by the executing software image copy on behalf of the end user, as well as to monitor any fees owed based on such use. In addition, software image creator/provider users and end users may interact with the CSSIUF system to update various information about their software images and subscriptions as appropriate, although in some embodiments and situations a creator user may not be allowed to alter a configured usage model for a software image (e.g., while one or more end users are executing copies of the software image, while one or more end users have subscriptions to the software image based on the configured usage model, etc.).

While not illustrated, some parties may serve multiple roles. For example, a software image creator may also provide one or more services that are available via the CSSIUF system. As another example, in some embodiments the entity providing the CSSIUF system may also create and share one or more software images, whether as free shared software images and/or as fee-based shared software images. In addition, some of the parties may be an entity (e.g., a company) instead of an individual.

Figure 1C:
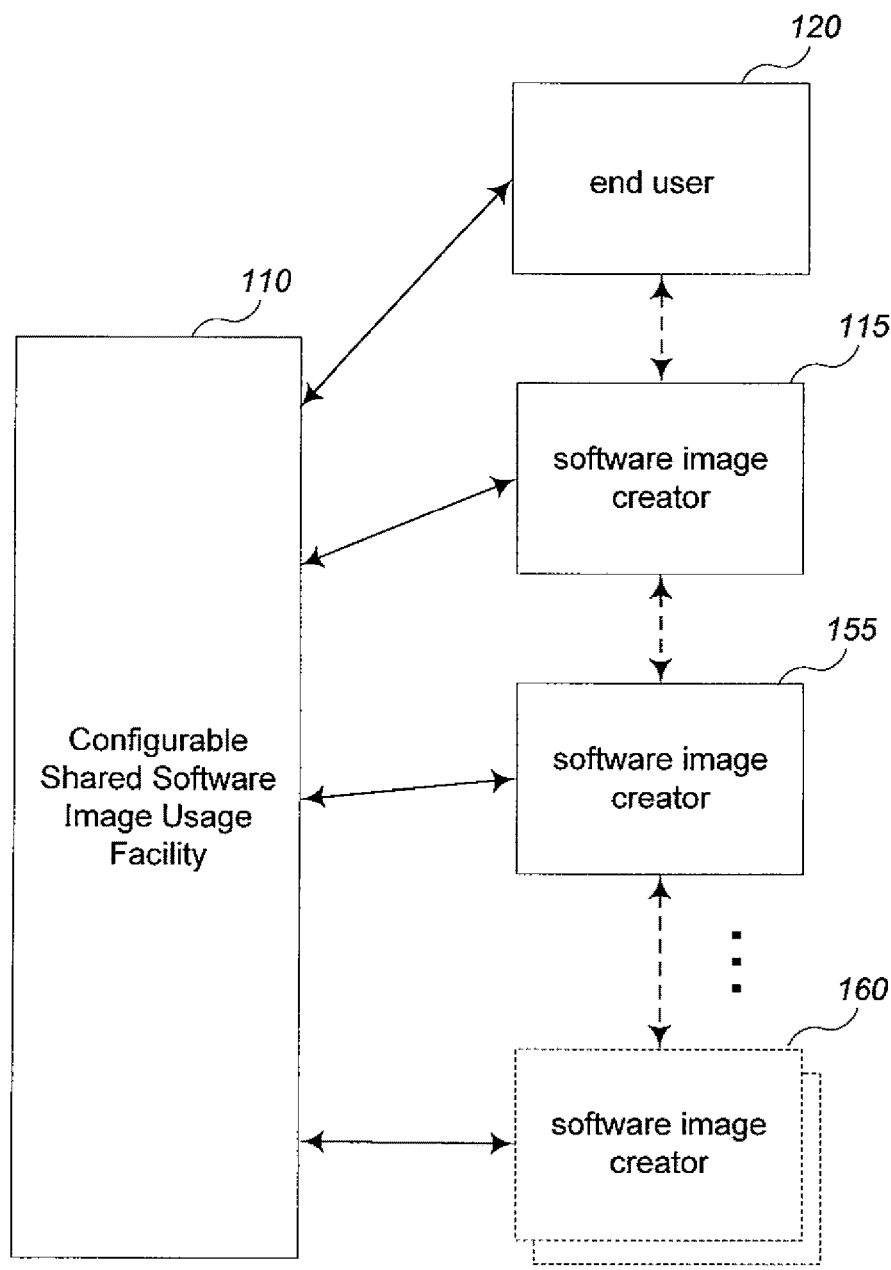

FIG. 1C illustrates an example of interactions similar to FIG. 1A, in which software image creator users configure usage models for created software images, but in FIG. 1C at least some of the created software images are enhanced software images that are based on other underlying software images. In this example, the one or more software image execution services 105 of FIG. 1A are not shown for the sake of simplification. In particular, in FIG. 1C, a software image creator user 155 has created a shared software image (not shown) that is available for execution by one or more other users via a software image execution service, and has configured one or more usage models for that shared software image via the CSSIUF system. While not illustrated in FIG. 1C, one or more end users may subscribe to and execute copies of the shared software image provided by software image creator user 155.

After the shared software image provided by software image creator user 155 is configured via the CSSIUF system 110, one or more other software creator users 115 may each create an enhanced shared software image (not shown) that is based on the underlying shared software image provided by software image creator user 155 (e.g., by adding one or more software programs to the underlying software image), and make the enhanced shared software image available for execution by one or more other users via a software image execution service. Each such creator user 115 may similarly interact with the CSSIUF system to configure one or more usage models for the enhanced shared software image that they have created, such as by selecting the shared software image provided by software image creator user 155, and modifying or expanding the configured usage model for that selected shared software image. After an enhanced software image from a software image creator user 115 is completed and has one or more configured usage models, an end user 120 may decide to execute a copy of the created enhanced software image, such as by interacting with the software image creator user's Web site (not shown) or in other manners (e.g., via a software image execution service via which the enhanced software image may be executed, via other Internet sites, such as a Web site associated with the CSSIUF system). The end user 120 then interacts with the CSSIUF system 110 to subscribe to the created enhanced software image, any may proceed to initiate execution of the enhanced software image by a software image execution service on behalf of the end user, in a manner similar to that described with respect to FIGS. 1A and 1B.

In addition, as illustrated in the example embodiment of FIG. 1C, the shared software image provided by software image creator user 155 may itself be an enhanced shared software image that is based on the last shared software image in a sequence or hierarchy of one or more shared software images created by one or more software image creator users 160, in a manner similar to that described previously with respect to FIG. 1C.

For illustrative purposes, some embodiments are described below in which specific embodiments of the CSSIUF system provide various specific types of capabilities with respect to various types of software images and services, including using specific types of user interfaces and other interactions. However, it will be appreciated that the described techniques may be used in a wide variety of other situations, including with other types of computer-implemented services, with other types of software, with other types of user interactions, etc., and that the invention is not limited to the exemplary details provided.

Figure 2B:
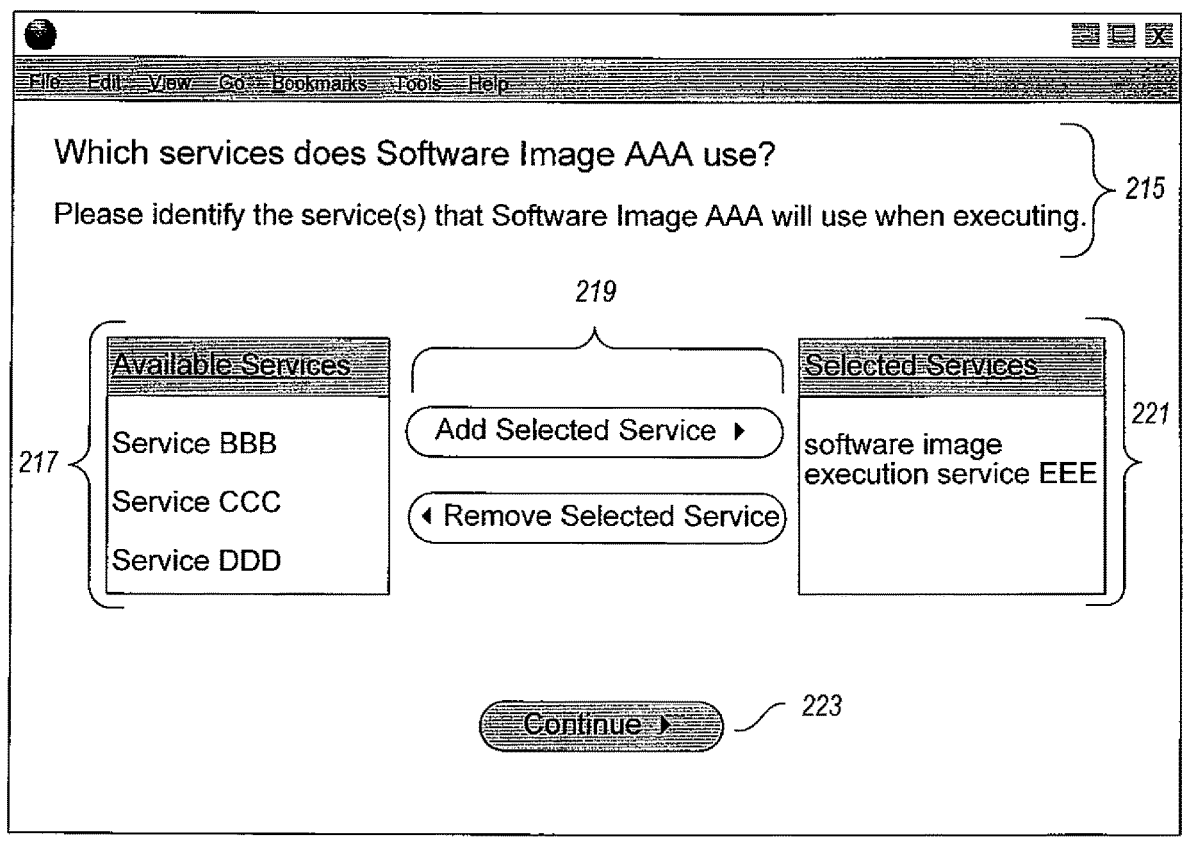

FIGS. 2A-2D illustrate examples of interactions between a software image creator user and an embodiment of a CSSIUF system in order to configure a usage model for a selected service to be used by a software image being created by the software image creator user. In particular, FIG. 2A illustrates an example user interface screen that may be displayed to a software image creator user to enable the software image creator user to specify various information related to a software image. In this example, the displayed information includes instructional information 201 for the software image creator, a section 203 in which the software image creator user can specify the name of the provider of the software image and the product name of the software image, a section 205 to provide a description of the software image, a section 207 to indicate a URL to redirect end users to after they have subscribed to the software image, a section 209 to provide terms and conditions, and a section 211 to provide contact information for the software image creator. In some embodiments, some or all of the contact information entered in section 211 is for use by the entity providing the CSSIUF system, and is not supplied to end users. After the software image creator user enters the appropriate information in FIG. 2A, the information is submitted to the CSSIUF system by selection of a user-selectable control (not shown).

Next, in this example, the software image creator user is presented with the user interface screen illustrated in FIG. 2B, to enable the software image creator user to select one or more services for use by the software image of the software image creator user. In particular, FIG. 2B includes an informational section 215, a list 217 of available services for the software image, a list 221 of selected services for the software image, user-selectable controls 219 for selecting and deselecting one or more services, and a user-selectable control 223 to submit the list of the selected services to the CSSIUF system. Additional information may be available for each of the available services in some embodiments, such as a description of the service, predefined pricing information, ratings or other assessment information, etc. Although only one service is selected in this example, which is example software image execution service EEE, multiple services (including multiple services from different parties) may be used by a software image.

Once the software image creator user selects the one or more services and uses the user-selectable control 223 to submit the selected services to the CSSIUF system, the user interface screen illustrated in FIG. 2C is presented to the software image creator user. In this example, the selected service has a single usage model that includes predefined pricing information for three use dimensions, but in other embodiments a service may have multiple alternative usage models that the software image creator may choose from (e.g., different usage models corresponding to different quality of service levels). In this example, FIG. 2C includes an information section 225, a section 227 for configuring the use prices based on the selected software image execution service EEE via which other users may execute copies of the shared software image, a section 229 for configuring optional recurring (e.g., monthly) and/or one-time fees, and a user-selectable control 231 for submitting the configured usage model to the CSSIUF system. In this example, the information specified in sections 227 and 229 will be part of the configured usage model for the use of the selected service by the software image, although in other embodiments additional types of information may be specified (e.g., service-specific use restrictions, service-specific terms and conditions, etc.) and/or some of the illustrated types of information may not be available to be specified. If multiple services had been selected, similar information would be displayed to the software image creator user for each of the services.

In this example, section 227 includes rows 227a, 227b and 227c, with each row corresponding to one of the use dimensions specified in the predefined pricing information for the selected service. The predefined pricing information is shown for each use dimension, including a predefined use price for a predetermined amount of use with respect to the use dimension. User-specifiable fields are also present to allow the software image creator user to specify a distinct configured use price for the same predetermined amount of use with respect to the use dimension. While not illustrated here, in some embodiments, the software image creator user may further be able to configure differing amounts of use and/or use dimensions. In this example, the software image creator user may further specify an optional explanation, which will be provided to end users during subscription to explain the configured pricing. Accordingly, since multiple software images may each configure different usage models for those software images' use of a single service such as software image execution service EEE, an end user using multiple such software images may be charged different fees for use of the same service.

Although not shown, in some embodiments additional information may be specified for the configured usage model. For example, in some embodiments a software image creator user may configure one or more use restrictions, such as to restrict a minimum or maximum use of a selected service, and/or to restrict the use of the software image to a particular type of use (e.g., non-commercial use). In some embodiments, some or all of the use restrictions of the selected service are automatically incorporated as use restrictions for the software image. As a second example, the software image creator may be able to specify particular aspects of billing, such as the billing cycle, or the smallest increment in which to bill (e.g., in tenths of a GB/month).

After the software image creator user selects user-selectable control 231 to define the configured usage model for the selected service, the software image creator user is presented with the example user interface screen of FIG. 2D to confirm the configured usage model. In particular, FIG. 2D includes an informational section 233, a section 235 with the configured use prices, a section 237 with additional fees for use of the software image, and a user-selectable control 239 to continue. In this example, sections 235 and 237 each contain a user-selectable control to allow the software image creator user to make changes if so desired. In this example, the CSSIUF system charges a fee for providing its capabilities (e.g., 10% after paying the service provider for use of the selected service), and sections 235 and 237 indicate that CSSIUF system fee as well as the portion of the fees from the end user that will be provided to the service provider and the software image creator user (or a separate provider of the software image that the software image creator user represents).

Figure 3A:
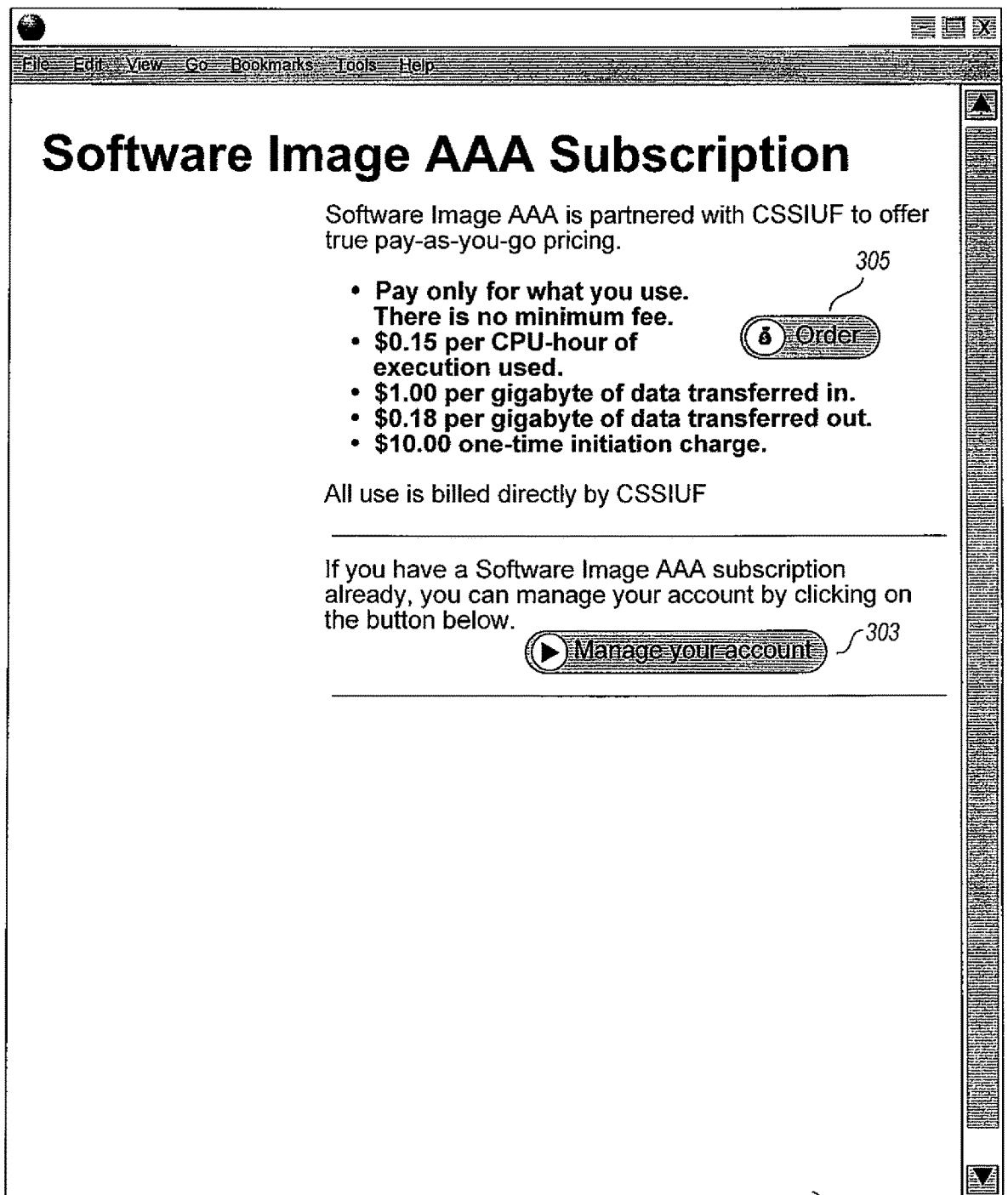

After the software image creator user selects user-selectable control 239, the software image creator will receive a software image key for use with the software image, as well as one or more indicated URLs to use to allow end users to interact with the CSSIUF system to subscribe to the software image and its use of the selected service. The software image key and the URLs may be provided to the software image creator in various manners, such as by email or displayed on a user interface. The software image creator may use the URLs in various ways, such as on the software image creator's Web site (e.g., as shown in FIG. 3A), or instead as part of the software image (e.g., to allow end user subscription to the software image via an executing copy of the software image, such as to allow limited use for free and additional use in accordance with a subscription).

The previously illustrated user interfaces are provided for example purposes, and the same or related functionality may be performed in other manners in other embodiments. For example, in other embodiments, more or less information may be displayed to a software image creator user and/or obtained from a software image creator user. Additionally, some or all of the information may be provided to a software image creator user and/or obtained from a software image creator user in other manners, such as programmatically rather than via a graphical user interface, or via the use of a custom application rather than via a Web-based interface.

After a software image has been created by a software image creator user and configured usage models have been specified for any selected services, end users may subscribe to use the software image. FIGS. 3A-3D illustrate examples of interactions between end users and an embodiment of the CSSIUF system in order to perform such a subscription process. In other embodiments, end users may obtain access to use such a software image in a manner other than via a subscription, such as based on payment of a one-time fee or in other manners. In this example, FIG. 3A illustrates an example user interface screen 301 on a software image creator's Web site, with the screen providing information to a potential end user about a particular software image. This example screen further allows the end user to purchase access to the software image or manage an existing subscription to the software image. In particular, in this example the user interface screen includes user-selectable controls to "Order" 305 access to the software image and to "Manage Your Account" 303. Information about the software image on the user interface screen includes an overview about pricing for use of the software image, a description of the software image, and a name of the software image. Additional information may be displayed in other embodiments, such as minimum system requirements and operating systems supported (e.g., for a software image that is available to be executed on a computing system selected by the end user, such as the end user's computing system).

Figure 3B:
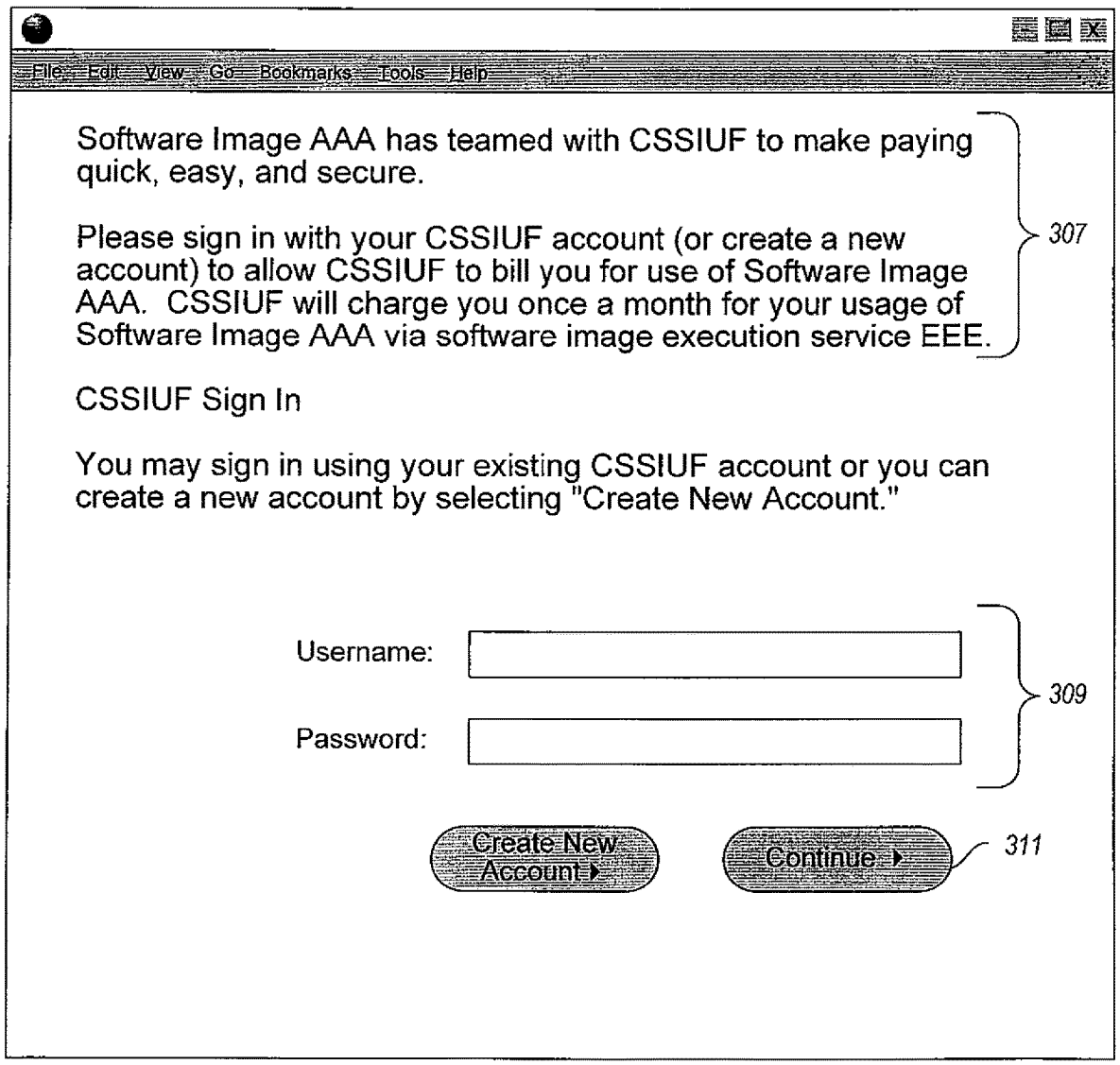
Figure 3D:
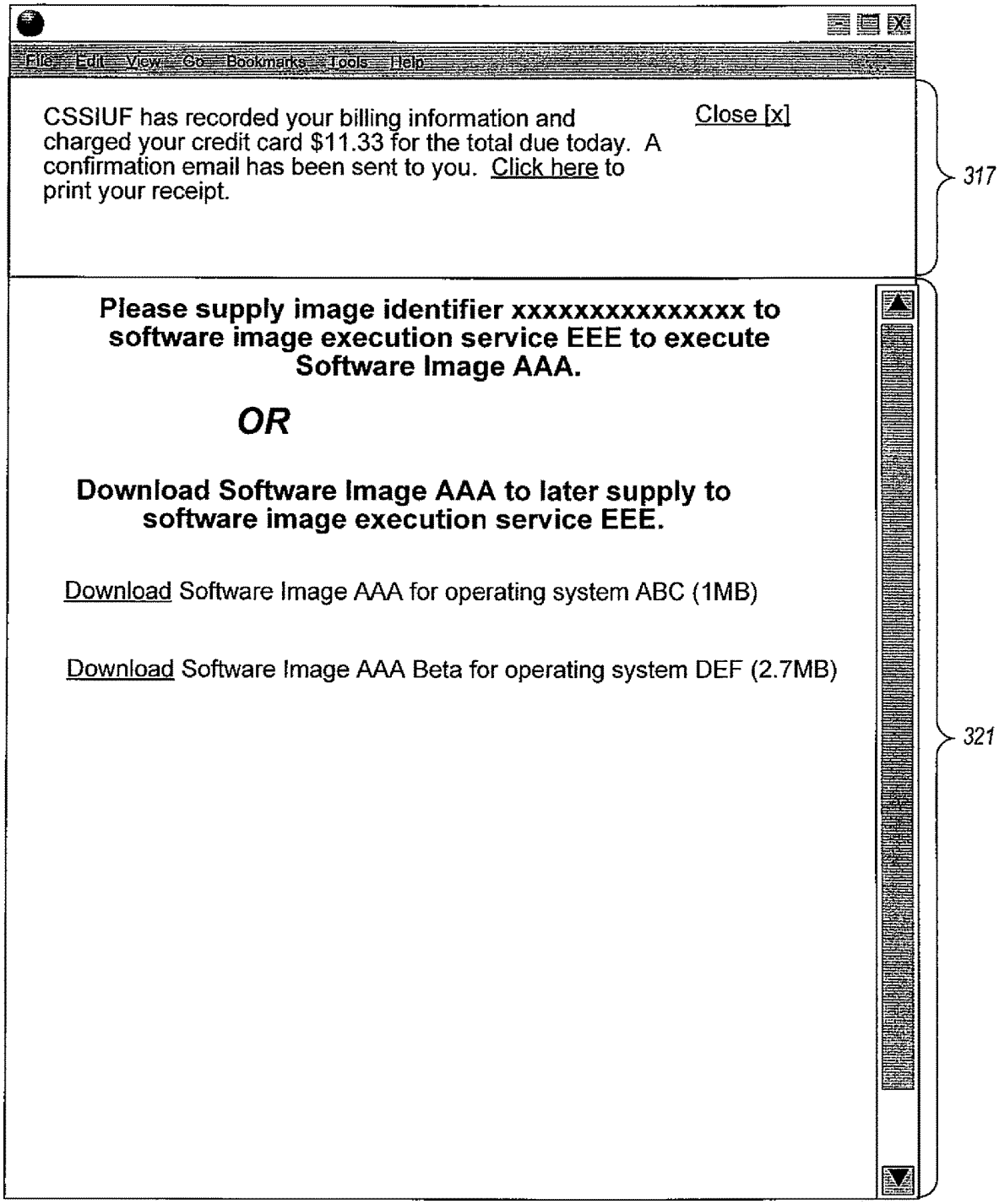

If the end user has not previously subscribed to the software image and selects the "Order" user-selectable control 305, the end user is presented with the user interface illustrated in FIG. 3B. FIG. 3B illustrates an example sign-in page for the end user that is provided by the CSSIUF system, and may in some embodiments correspond to a URL supplied by the CSSIUF system to the software image creator when configuring a usage model for the software image. In this example, FIG. 3B includes an instructional information section 307, a section 309 for the end user to specify a username and password, and a user-selectable control 311 to continue the subscription process. The end user may create a new user account with the CSSIUF system, or in this example, is able to use a username and password for an account on an associated system if one already exists. If the end user is creating a new user account, the end user may be prompted to provide various types of information (e.g., payment information), which is not shown here. In addition, while not illustrated here, in some embodiments the CSSIUF system may gather information from the end user for one or more underlying selected services, such as to be supplied to the provider(s) of those service(s).

After the end user has specified the various types of information for a new user account, or if the end user signs in to an account for which such information is already available, the user interface screen 313 of FIG. 3C is displayed to the end user. The user interface screen 313 provides information to the end user regarding the configured usage model for the software image, and allows the end user to place an order for a subscription for access to the software image. In particular, FIG. 3C includes various information about fees charged by the configured usage model (e.g., one-time setup fees and/or recurring monthly fees), and about end user payment information that may be used to pay the fees. In this example, the information about the configured usage model for the software image includes the configured use price for each of the use dimensions for the selected software image execution service EEE. In addition, in this example, FIG. 3C includes a section 315 for the end user to agree to terms and conditions, such as terms and conditions specified by the CSSIUF system, by the software image (e.g., as specified in section 209 of FIG. 2A), and/or by one or more of the selected services. However, in other embodiments, the end user may have agreed to some of those terms and conditions at other times, or no such terms and conditions may be used. In addition, while the end user paid for the software image subscription using a credit card in this example, various other payment methods (e.g., an ACH transaction, a debit card, a gift card) may be used in other embodiments.

After reviewing the information displayed in FIG. 3C, the user may proceed with the subscription process by selecting the "Place Your Order" user-selectable control 317. In this example, after appropriate processing by the CSSIUF system (e.g., checking that the end user has agreed to the terms and conditions, charging the end user for the setup fees and any recurring monthly fee, etc.), the user is presented with the example user interface screen illustrated in FIG. 3D. In this example, the user interface screen of FIG. 3D contains a receipt section 317 corresponding to the description, and a section 321 (e.g., based on the URL specified in section 207 of FIG. 2A) with information to enable the end user to initiate execution of the software image. The section 321 in this example indicates an image identifier for the end user to supply to selected software image execution service EEE to allow it to identify a stored copy of software image AAA, although in other embodiments other types of information (e.g., a user token) may instead be supplied and/or information may be supplied in other manners. In addition, in this example, a receipt was also sent via email to the end user. The section 321, in this example, further includes user-selectable controls to allow the end user to download a copy of the software image, so that the downloaded software image copy may be provided by the end user to the selected software image execution service EEE (or in other embodiments executed elsewhere).

As with the example user interfaces for use in configuring usage models, the illustrated user interfaces for end user subscription are provided for example purposes, and the same or related functionality may be performed in other manners in other embodiments. For example, in other embodiments more or less information may be displayed to an end user and/or obtained from an end user. Additionally, some or all of the information may be provided to an end user and/or obtained from an end user in other manners, such as programmatically rather than via a graphical user interface, or via the use of a custom application rather than via a Web-based interface.

Figure 4:
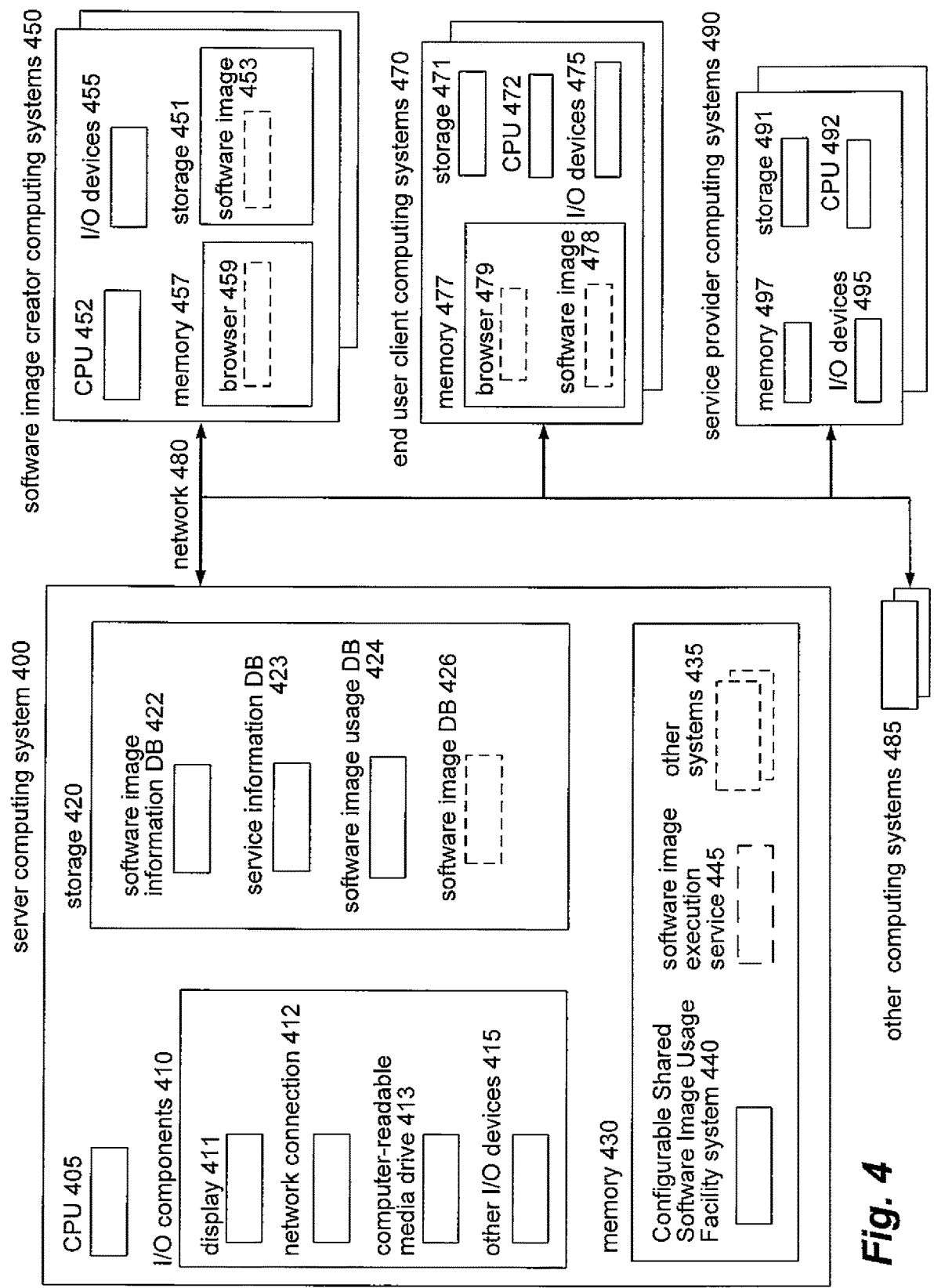
FIG. 4 is a block diagram illustrating an example embodiment of a computing system suitable for facilitating sharing of software images in a configurable manner.

FIG. 4 illustrates a server computing system 400 suitable for executing an embodiment of the Configurable Shared Software Image Usage Facility ("CSSIUF") system, as well as various other computing systems. In this example, the other computing systems include one or more software image creator computing systems 450, one or more end user client computing systems 470, one or more service provider computing systems 490, and one or more other computing systems 485. In the illustrated embodiment, the server computing system 400 includes a CPU 405, various I/O components 410, storage 420, and memory 430. The I/O components include a display 411, a network connection 412, a computer-readable media drive 413, and other I/O devices 415 (e.g., a keyboard, a mouse, speakers, etc.). The other computing systems 450, 470, 485 and 490 may each include similar components to some or all of the components illustrated with respect to server computing system 400, but at least some such included similar components are not illustrated in this example for the sake of brevity.

A software embodiment of the CSSIUF system 440 is executing in memory 430, and it interacts with the other computing systems over the network 480 (e.g., via the Internet and/or the World Wide Web, via a private cellular network, etc.). The other computing systems may similarly execute various software as part of the interactions. For example, a Web browser 459 executing in memory 457 of a software image creator computing system allows a software image creator user to interact with the CSSIUF system (e.g., to configure usage models for their software images and/or to monitor use of their software images). In addition, a Web browser 479 executing in memory 477 of an end user client computing system allows end users to interact with the CSSIUF system (e.g., to subscribe to a software image). Furthermore, a network-accessible service server (not shown) may execute in memory 497 of a service provider computing system, such as to provide a service (e.g., a network-accessible service) that is registered with the CSSIUF system and used by one or more executing software images.

In this illustrated embodiment, a software image creator user creates a software image 453 that is stored on storage 451 of the software image creator computing system, and that is configured via the CSSIUF system to use one or more services, such as a specified software image execution service and/or one or more services provided by one or more service provider computing systems. In this example, the specified software image execution service is the software image execution service 445 that is optionally executing in memory 430 (e.g., if the CSSIUF system 440 is integrated with or otherwise configured to use such a software image execution service provided by the same server computing system 400 and/or other associated computing systems), although in other embodiments one or more other software image execution services may be used, such as a software image execution service (not shown) that is executing on one or more of the other computing systems 485. After the software image 453 is configured to use the specified software image execution service 445, one or more of the end users may then optionally obtain a copy 478 of the software image 453, such as based on interactions with the software image creator computing system, although in other embodiments the software image 453 may instead be obtained by, optionally stored by (e.g., in an optional software image database data structure 426 on storage 420) and executed by the software image execution service 445 after the end user has completed a corresponding subscription process via the CSSIUF system. In the illustrated embodiment, other database data structures 422, 423 and 424 are also present on the storage 420 for use by the CSSIUF system, such as to store information about software images and their configured usage models, about selectable underlying services and their predefined usage models, and about tracked usage of software images on behalf of users, although in other embodiments some or all such databases may instead be located elsewhere and/or be organized in other manners. Furthermore, in other embodiments the stored information may be stored in other manners. In addition, one or more optional other software systems 435 may also be executing on the server computing system, and in other embodiments the system 440 may instead interact with one or more other software image execution services provided on computing systems 490 and/or other computing systems 485 (e.g., by third-party service providers).

It will be appreciated that the illustrated computing systems are merely illustrative and are not intended to limit the scope of the present invention. The computing systems 400, 450, 470, 485 and/or 490 may instead each include multiple interacting computing systems or devices, and those computing systems may be connected to other devices that are not illustrated, including through one or more networks such as the Internet, via the Web, or via private networks (e.g., mobile communication networks, etc.). More generally, a server or client computing system or device may comprise any combination of hardware or software that can interact, including (without limitation) desktop or other computers, network devices, PDAs ("Personal Digital Assistants"), cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems 440 and/or 445 may in some embodiments be distributed in various components. In addition, in some embodiments, at least some of the described functionality may instead not be provided as part of an embodiment of the CSSIUF system and/or other additional functionality may be available.

It will also be appreciated that, while various items are discussed or illustrated as being stored in memory or on storage while being used, these items or portions of them may be transferred between memory and other storage devices for purposes of memory management and data integrity. Alternatively, in other embodiments some or all of the software systems may execute in memory on another device and communicate with the illustrated computing systems via inter-computer communication. Furthermore, in some embodiments, some or all of the systems and/or components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components and/or data structures may also be stored (e.g., as software instructions or structured data) on a computer-readable medium, such as a hard disk, memory, a network, or a portable media article (e.g., a DVD or a flash memory device) to be read by an appropriate drive or via an appropriate connection. The systems and data structures may also be transmitted via generated stored data signals (e.g., by being encoded in a carrier wave or otherwise included as part of an analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present techniques may be practiced with other computer system configurations.

Figure 10:
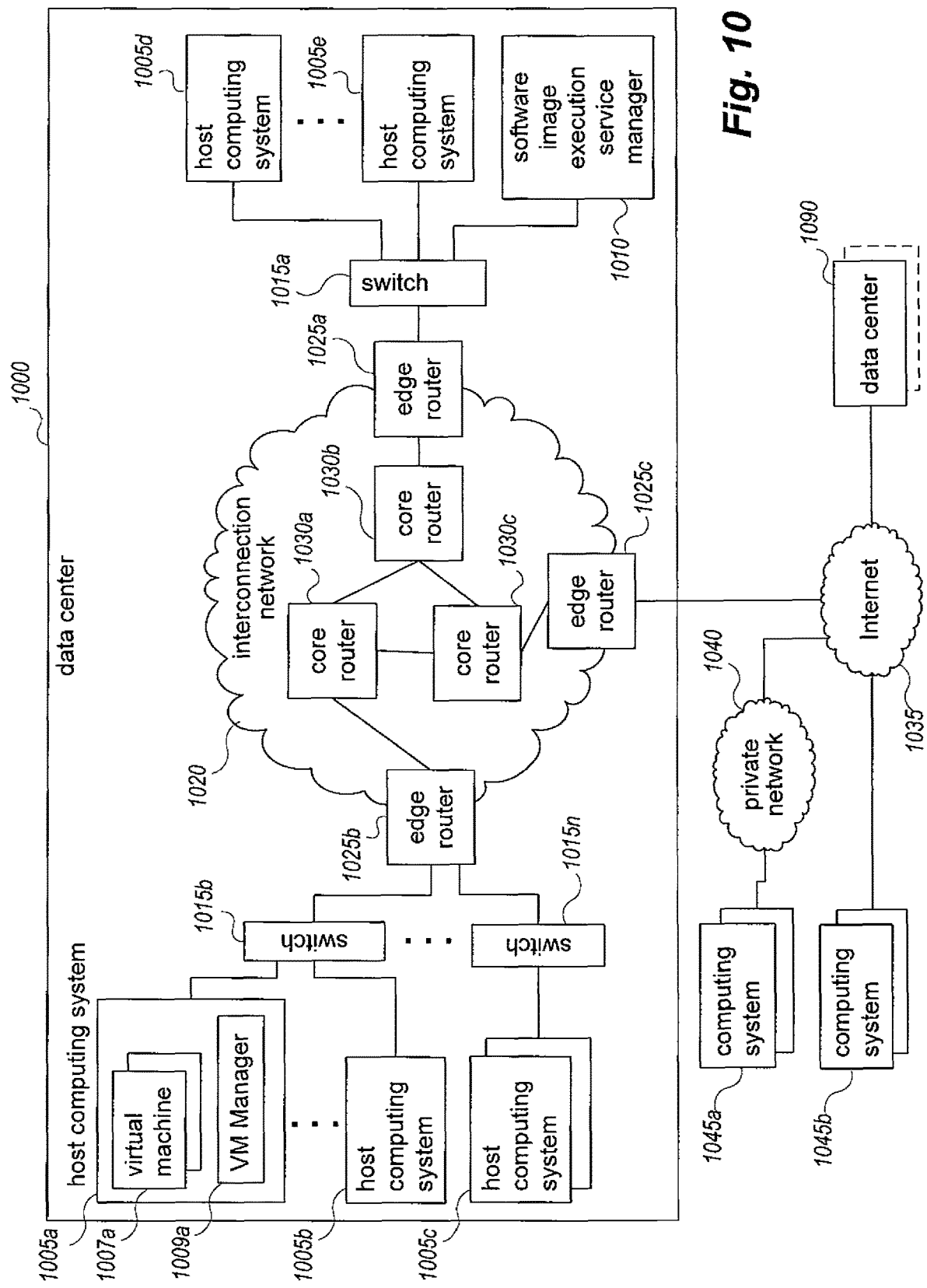
FIG. 10 is a network diagram illustrating an example embodiment of computing systems suitable for facilitating sharing of software images in a configurable manner.

FIG. 10 illustrates an embodiment in which a software image execution service, and optionally a CSSIUF facility, may be provided using one or more data centers that include multiple physical computing systems (e.g., other computing systems 485 of FIG. 4). In particular, FIG. 10 is a network diagram illustrating an example embodiment in which a system manager component of a software image execution service manages execution of software images on behalf of users, and may further in some embodiments perform operations of an embodiment of a CSSIUF system that is integrated with the software image execution service. The illustrated example includes a data center 1000 operated by the software image execution service that is connected to the Internet 1035 external to the data center 1000. In this example, the Internet 1035 provides access to various external computing systems, such as computing systems 1045a via private network 1040 and computing systems 1045b. The private network 1040 may be, for example, a corporate network that is wholly or partially inaccessible from non-privileged computing systems external to the private network 1040. Computing systems 1045b may include, for example, a home computing system that connects directly to the Internet (e.g., via a telephone or cable modem, a Digital Subscriber Line ("DSL"), etc.). In addition, one or more other data centers 1090 are illustrated that are connected to data center 1000 via the internet 1035, such as may further be used by the software image execution service in at least some embodiments.

The data center 1000 includes a number of physical host computing systems 1005a-1005e and a System Manager component 1010 of the software image execution service. In this example, host computing system 1005a provides multiple virtual machines 1007a and a virtual machine ("VM") Manager component 1009a to manage those virtual machines (e.g., a hypervisor or other virtual machine monitor), and some or all of the other host computing systems 1005b-105e may similarly have one or more such virtual machines and/or VM Manager components (not shown). Alternatively, in other embodiments, some or all of the physical host computing systems at the data center may not provide any virtual machines, such as to instead directly execute one or more software images or other software programs on behalf of end user customers of the software image execution service. Furthermore, in some embodiments various of the host computing systems may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, particular users and/or their software images may be grouped (e.g., automatically) according to one or more such factors, which may further be used as constraints and/or preferences regarding which host computing systems to select for particular software image copies.

The data center further includes multiple networking devices, such as switches 1015a and 1015b-1015n, edge routers 1025a-1025c, and core routers 1030a-1030c. Switch 1015b is part of a physical network that includes two or more physical host computing systems 1005a-1005b, and is connected to edge aggregation router 1025b. Edge aggregation router 1025b connects the switched network for switch 1015b to an interconnection network 1020 of the data center, and further in the illustrated embodiment connects one or more other switches 1015n (and their switched networks of host computing systems 1005c) to each other, to switch 1015b, and to the interconnection network. Switch 1015a is part of a distinct physical network that includes physical computing systems 1005d-1005e and a computing system providing the System Manager component 1010, and is connected to edge router 1025a. Numerous other computing systems and networking devices, including other switches connected to edge router 1025a, may be present, but are not illustrated here for the sake of brevity. The physical networks established by switch 1015a and by switches 1015b-1015n are connected to each other and other networks (e.g., the Internet 1035) via the interconnection network 1020, which includes the edge routers 1025a-1025c and the core routers 1030a-1030c. The edge routers 1025a-1025c provide gateways between two or more networks. For example, edge router 1025a provides a gateway between the physical network established by switch 1015a and the interconnection network 1020. Edge router 1025c provides a gateway between the interconnection network 1020 and Internet 1035, as well as to the dedicated high-speed data connection 1080. The core routers 1030a-1030c manage communications within the interconnection network 1020, such as by forwarding packets or other data transmissions as appropriate based on characteristics of such data transmissions (e.g., header information including source and/or destination addresses, protocol identifiers, etc.) and/or the characteristics of the interconnection network 1020 itself (e.g., routes based on network topology, etc.).

The illustrated System Manager component 1010 performs at least some of the described techniques in order to manage execution of software images and other software programs on the physical host computing systems 1005a-1005e, as described in greater detail elsewhere. When a particular host computing system is selected to execute one or more software image copies, the System Manager component may in some embodiments initiate execution of those software image copies by interacting with a VM Manager component (or other manager component if the selected host computing system does not provide virtual machines) that controls execution of programs for that selected host computing system for the software image execution service, or may alternatively directly execute the software image copy on the selected host computing system. In addition, as discussed in greater detail elsewhere, the System Manager component 1010 may interact with an embodiment of a CSSIUF system while execution to facilitate sharing of software images by users, such as a remote CSSIUF system (e.g., provided by a computing system 1045b), a CSSIUF system executing within the data center 1000 (e.g., by one of the host computing systems 1005), and/or a CSSIUF system that is integrated with the System Manager component 1010 such that the component 1010 manages the software image execution service and provides capabilities of the CSSIUF system.

It will be appreciated that the data center of FIG. 10 is provided for illustrative purposes only, and that software image execution services and other software execution services may be provided in other manners in other embodiments.

Figure 5:
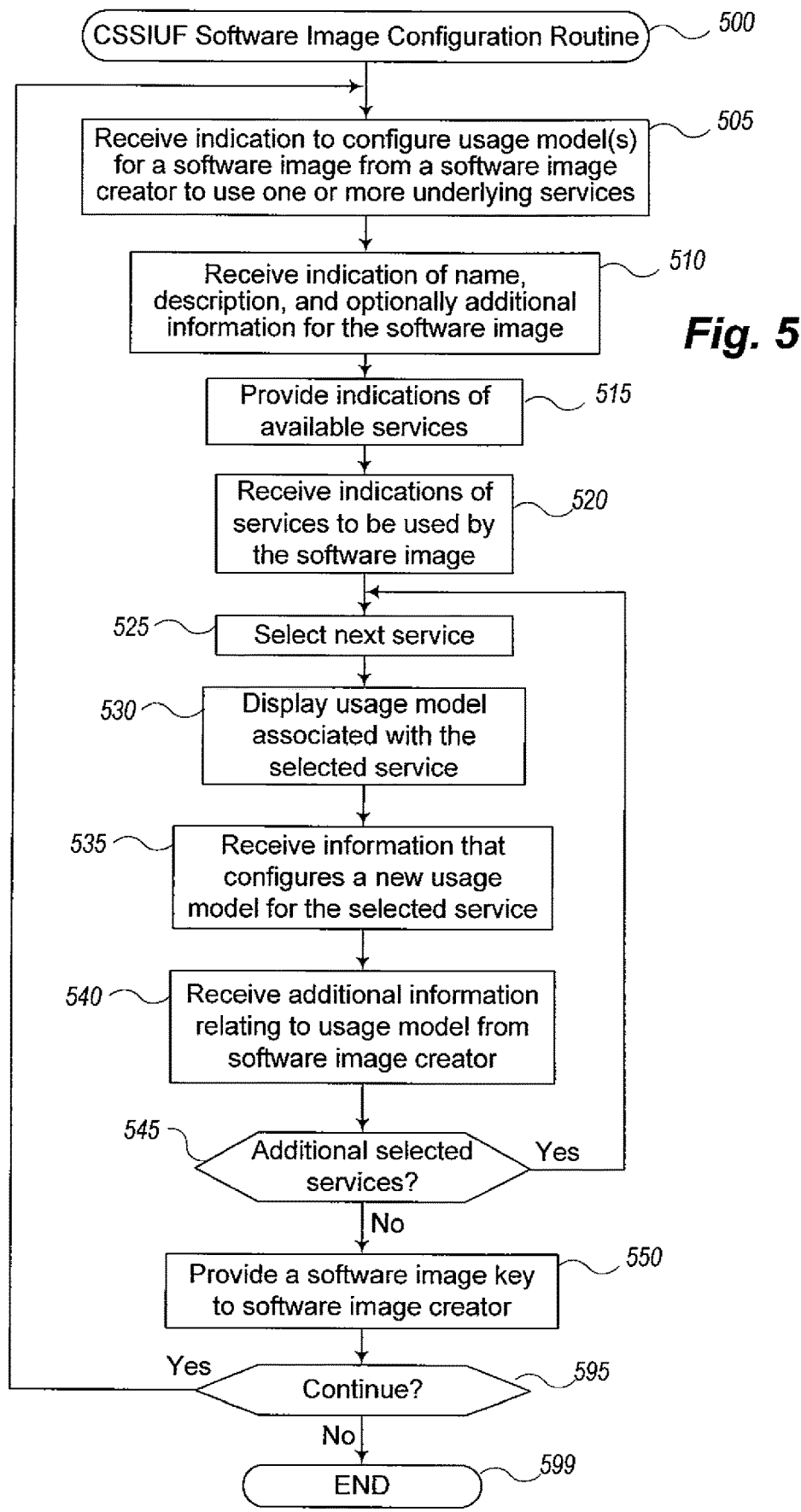
FIG. 5 is a flow diagram of an example embodiment of a CSSIUF Software Image Configuration routine.

FIG. 5 is a flow diagram of an example embodiment of a CSSIUF Software Image Configuration routine 500. The routine may, for example, be provided by execution of a configuration component of the CSSIUF system 110 of FIGS. 1A-1C and/or of the CSSIUF system 440 of FIG. 4, such as to allow software image creators to configure usage models for services used by their software images. In this illustrated example, the usage model configuration is performed in an interactive manner by the software image creator, although in other embodiments it may be performed in other manners, such as by the CSSIUF system automatically determining configured use prices for one or more services (e.g., by charging a predetermined amount above the default use price or a predetermined multiple of the default use price).

The routine begins at block 505, where the routine receives an indication from a software image creator user to configure usage models for one or more services to be used by execution of an indicated software image. In block 510, information is received from the software image creator user that indicates a name, a description and optionally additional information for the indicated software image. A variety of types of additional information may be specified, and some types of additional information indicated may depend on the type of software image. After receiving the information about the software image, the routine continues to block 515, where the routine provides indications of one or more available services (e.g., one or more software image execution services that may execute the indicated software image on behalf of users), such as by displaying them to the software image creator user. In some embodiments, some services associated with the CSSIUF system may not be available for the software image (e.g., based on use restrictions in the usage models of various software images, based on previous service selections, etc.). In block 520, the routine receives indications of one or more of the services that are specified by the software image creator user to be used by the software image.

After receiving the indications of the services specified by the creator user, the routine proceeds to block 525, where the next specified service is selected, beginning with the first. Once the service is selected, the routine continues to block 530, where the predefined usage model for the service is displayed. After displaying the predefined usage model, the routine continues to block 535, where it receives information from the software image creator user for a new configured usage model for use of the selected service by the executing software image. In some embodiments, the CSSIUF system may assist the software image creator user by suggesting various information for the configured usage model, such as one or more suggested configured use prices. After receiving the configured usage model information, the routine proceeds to block 540, where additional information for the usage model may optionally be received from the software image creator user and/or the CSSIUF system for use as part of the configured usage model. A variety of types of additional information may be specified in various embodiments, including timing for obtaining payments (e.g., billing date, billing cycle), promotions, discounts to be provided via discount coupons to be used, etc.

At block 545, the routine determines whether additional services were specified by the creator user in block 520, and if so the routine returns to block 525. If not, the routine continues to block 550, where in the illustrated embodiment it provides a software image key to the software image creator user for use with the software image. In other embodiments, the software image creator user may instead be permitted to specify a software image key to be used with the software image, or instead no such software image keys may be provided (e.g., if a software image key is instead directly provided to a selected software image execution service for its use) or used. In some embodiments, the routine may provide additional information to the software image creator user, such as information to direct potential end users of the software image to the CSSIUF system to subscribe to use of the software image. After block 550, the routine continues to block 595 to determine whether to continue. If so, the routine returns to block 505, and if not continues to block 599 and ends.

Figure 6:
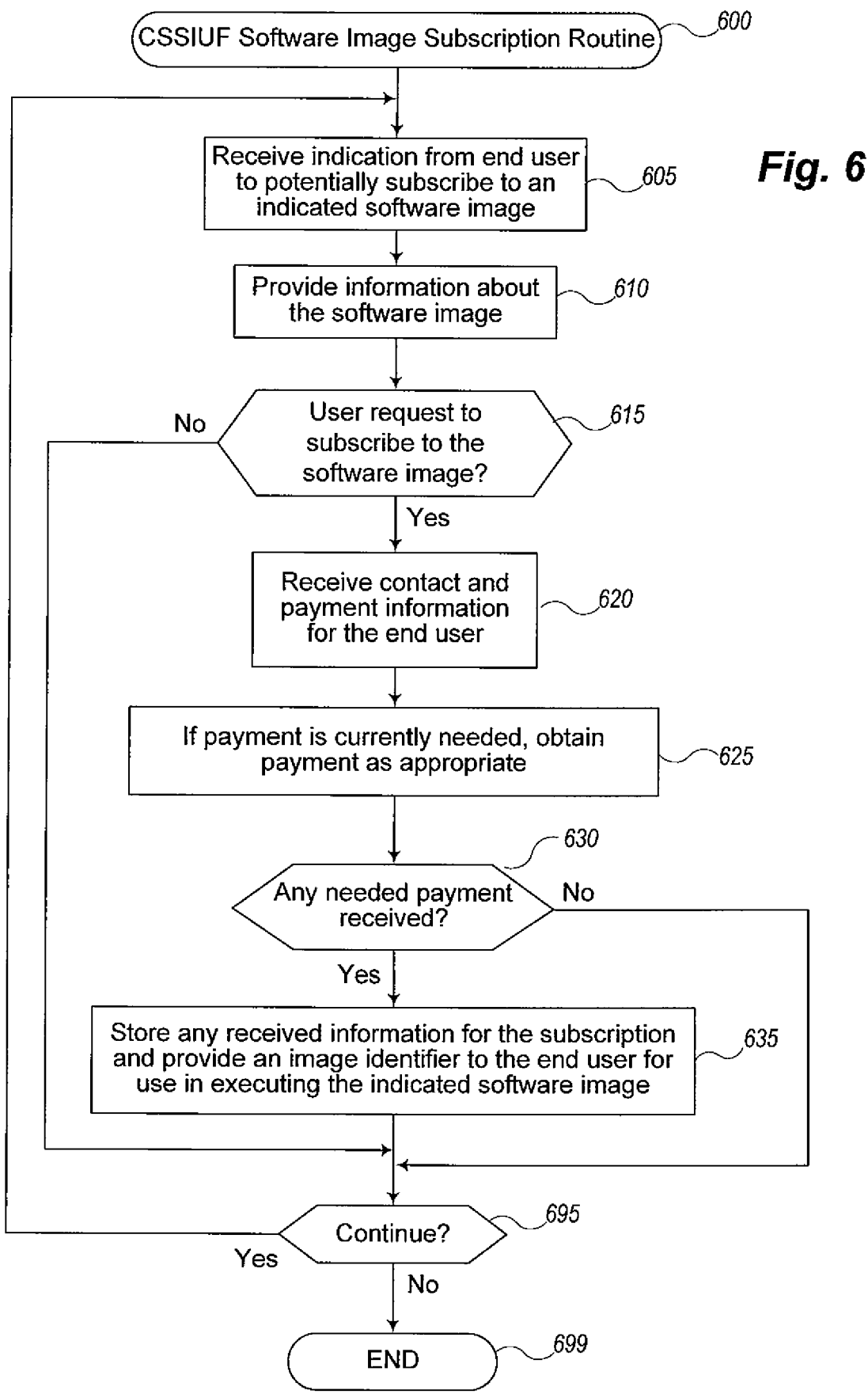
FIG. 6 is a flow diagram of an example embodiment of a CSSIUF Software Image Subscription routine.

FIG. 6 is a flow diagram of an example embodiment of the CSSIUF Software Image Subscription routine 600. The routine may, for example, be provided by execution of a subscription component of the CSSIUF system 110 of FIGS. 1A-1C and/or of the CSSIUF system 440 of FIG. 4, such as to subscribe end users for use of indicated software images. While in the illustrated embodiment the routine creates subscriptions for end users to enable use of indicated software images, in other embodiments the routine may provide access to indicated software images for end users in other manners.

The routine begins at block 605, where an indication is received from an end user to initiate a potential subscription to an indicated software image. The routine then continues to block 610 to display information about the indicated software image to the end user and to optionally display information to the end user about the services that the shared image uses, although in other embodiments some or all of that information may instead not be provided or may be provided in other manners (e.g., already have been displayed to the end user by the software image creator, such as on a Web site associated with the software image creator). The displayed information may include information about the one or more configured usage models for the indicated software image, a description of the software image, etc.

After displaying the information to the end user, the routine proceeds to block 615, where the routine determines if the end user has decided to request a subscription to the specified software image, such as based on selection by the end user of a corresponding user-selectable control. If so, the routine continues to block 620, and if not proceeds to block 695. At block 620, the routine receives contact and payment information for the end user. In at least some embodiments, the information may be retrieved from an existing account at an associated system if such an account is available. After receiving contact and payment information, the routine proceeds to block 625 to determine whether the subscription to the software image has an initial upfront fee (e.g., a one-time setup fee, the first month of a recurring monthly fee, etc.), and if so to attempt to obtain payment for the fee. If it is determined in block 630 that payment is obtained or if no payment is currently needed, the routine proceeds to block 635 to create the subscription and store related information. In addition, in the illustrated embodiment, the routine provides an image identifier to the end user for use in initiating execution of a copy of the software image by the end user. In some embodiments, additional functionality (not shown) may be provided, such as to redirect the end user to a Web page from which the end user may download or initiate use of the software image, to provide the end user with a user token that encodes or otherwise represents the end user's authorization to executing a copy of the software image, etc. Furthermore, in some embodiments, the routine may determine whether an end user is authorized to obtain a subscription to or otherwise execute an indicated software image, such as based at least in part on access criteria or other indicated information in a configured usage model for the indicated software image, and if not may not perform at least blocks 625 and 635. After block 635, the routine continues to block 695. Alternatively, if payment was needed but not received in block 625, then the routine in the illustrated embodiment proceeds from block 630 to block 695 without creating the subscription for the end user. In other embodiments, the routine may instead proceed in other manners, such as to create a subscription for the end user even if the needed payment was not received (or if a determination as to whether the needed payment has been received may not be available until a later time), but to later fail to authenticate execution initiation and/or service access requests if payment is still not received at that time. At block 695, the routine determines whether to continue. If so, the routine returns to block 605, and if not ends at block 699.

While not illustrated here, in some embodiments various additional security mechanisms may be used, such as to ensure that only authorized end users are allowed to subscribe to some or all of the software images. Similarly, in some embodiments various anti-fraud mechanisms may be utilized, such as to ensure that valid payment is received from an end user and/or to prevent abuse of a configured usage model through multiple accounts or violations of use conditions.

Figure 7A:
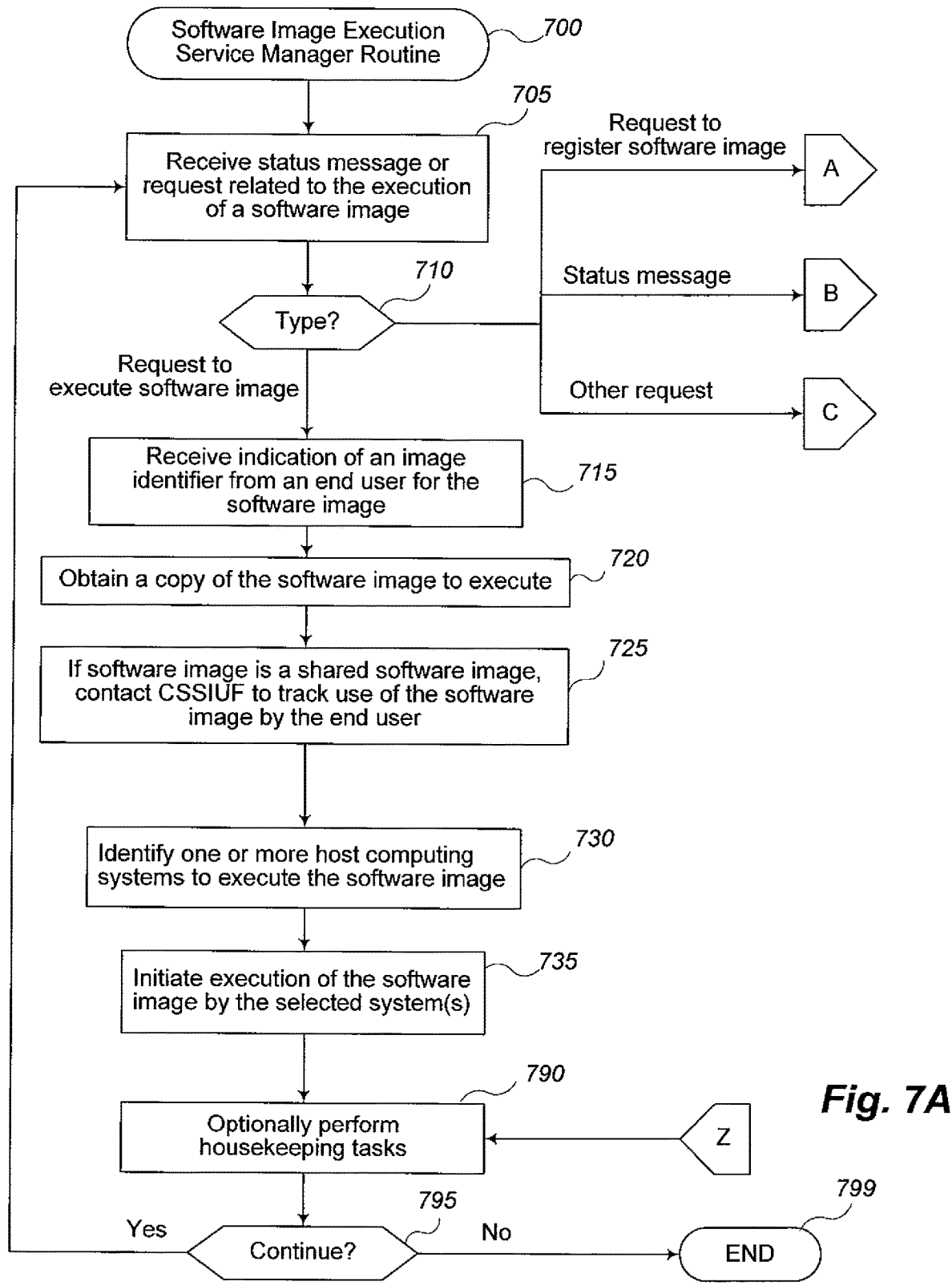
FIGS. 7A and 7B are a flow diagram of an example embodiment of a Software Image Execution Service Manager routine.
Figure 7B:
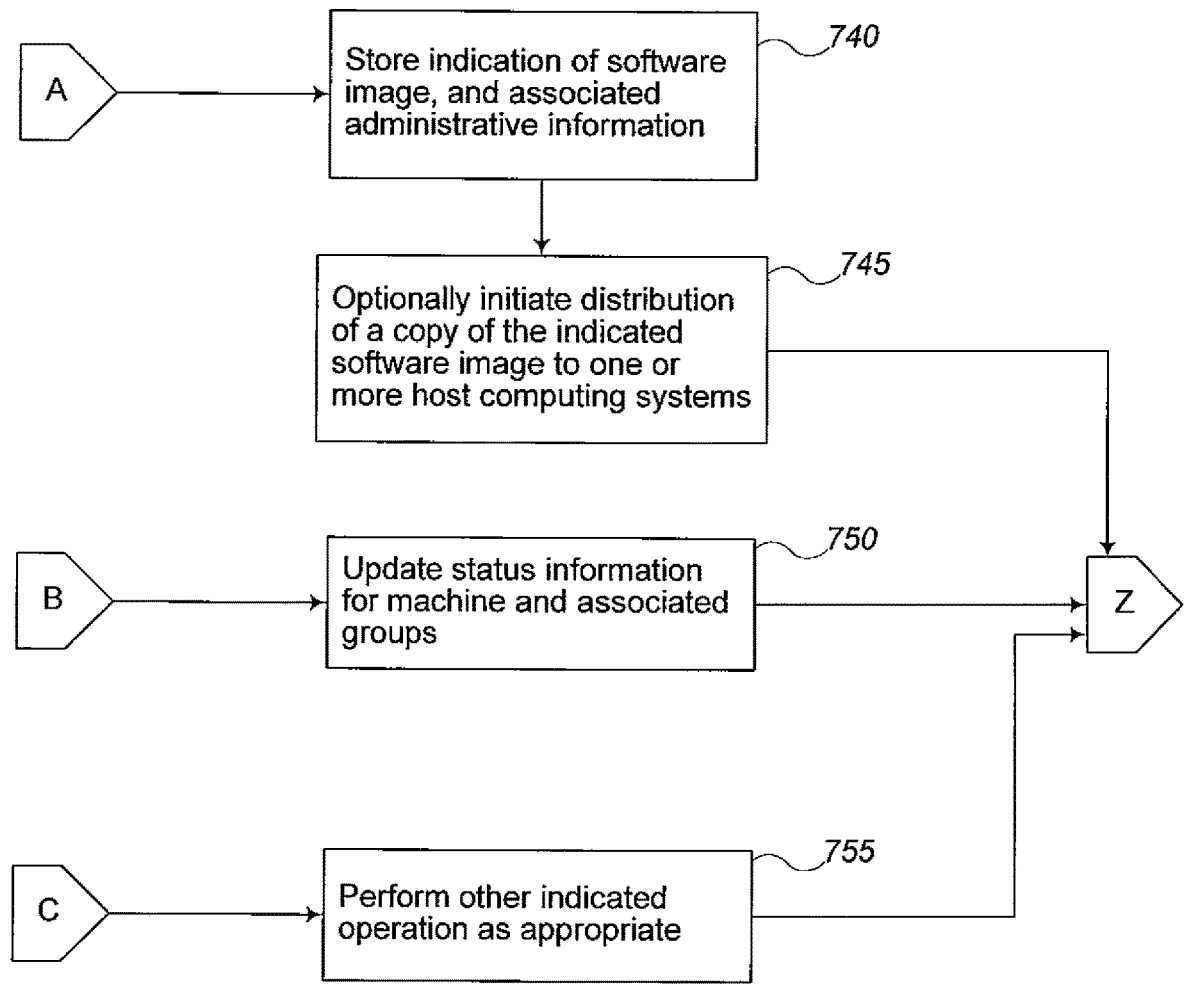

FIGS. 7A and 7B illustrate a flow diagram of an example embodiment of a System Manager routine 700. The routine may be provided by, for example, execution of the System Manager components 1010 of FIG. 10 and/or 445 of FIG. 4 in order to manage execution of software images and/or other software programs by a software image execution service or other software execution service.

The illustrated embodiment of the routine 700 begins at block 705, where a request related to the execution of a software image or a status message related to software image execution is received. In this embodiment, the request may be received from various sources internal or external to the software image execution service (e.g., a remote customer user requesting execution of one or more copies of an indicated software image). In block 710, the routine determines the type of request received.

If it is determined in block 710 that the request is to execute one or more copies of a software image, the routine continues with block 715. In block 715, the routine receives an indication from a user of identifying information for the user (e.g., a unique user identifier, login information, etc.) and an image identifier that corresponds to the one or more software images to be executed, although in other embodiments other types of information may be received (e.g., a user token that reflects a subscription to the indicated software image or other access authorization for the indicated software image). The image identifier may correspond to the one or more software images to be executed by identifying one or more software images that are already stored by or otherwise registered with the software image execution service and/or an associated CSSIUF system, while in other embodiments the end user may instead supply a copy of the indicated software image(s) to be executed. In block 720, the routine then obtains a copy of the indicated software image(s), such as by retrieving a stored or otherwise accessible copy for each, and in block 725 contacts a CSSIUF system to verify the end user's authorization to execute the indicated software image(s) and to provide information to allow the CSSIUF system to track use of the indicated software image(s) by the end user, although in other embodiments one or both of these activities of block 725 may instead not be performed. The routine then continues to block 730 to attempt to identify one or more candidate host computing systems that are available to and appropriate for executing at least one software image copy. The routine then continues to block 735 to initiate execution of those software image copies on those selected host computing systems.

If it is instead determined in block 710 that the request received in block 705 is to register a software image of a user for later use (e.g., to provide a copy of the software image to the software image execution service for storage, to provide information about a configured usage model for a software image, etc.), the routine continues to block 740. In block 740, the routine stores provided information about the software image, and in block 745 optionally proceeds to provide one or more copies of the software image to one or more distributed storage locations near to or otherwise associated with particular subsets of the host computing systems (e.g., to local software image caches at each of one or more data centers). Alternatively, if it is determined in block 710 that a message is received in block 705 with status information related to execution of software images by host computing systems (e.g., periodic reports on amounts of resource usage on various host computing systems, a report of a failure of a computing system or other hardware device, a report of a failure of an executing software image copy based on its early termination, etc.), the routine continues instead to block 750 to store that status information for later use (e.g., for use in selecting particular host computing systems). Otherwise, if it is instead determined in block 710 that some other type of request or message is received in block 705, the routine continues to block 755 to handle the request or message as appropriate.

After blocks 735, 745, 750, or 755, the routine continues to block 790 to optionally perform any periodic housekeeping operations (e.g., to determine whether to move some executing software image copies from current host computing systems to other host computing systems, such as to balance utilization of resources or for other reasons). After block 790, the routine continues to block 795 to determine whether to continue, and if so returns to block 705. If not, the routine continues to block 799 and ends.

Figure 8:
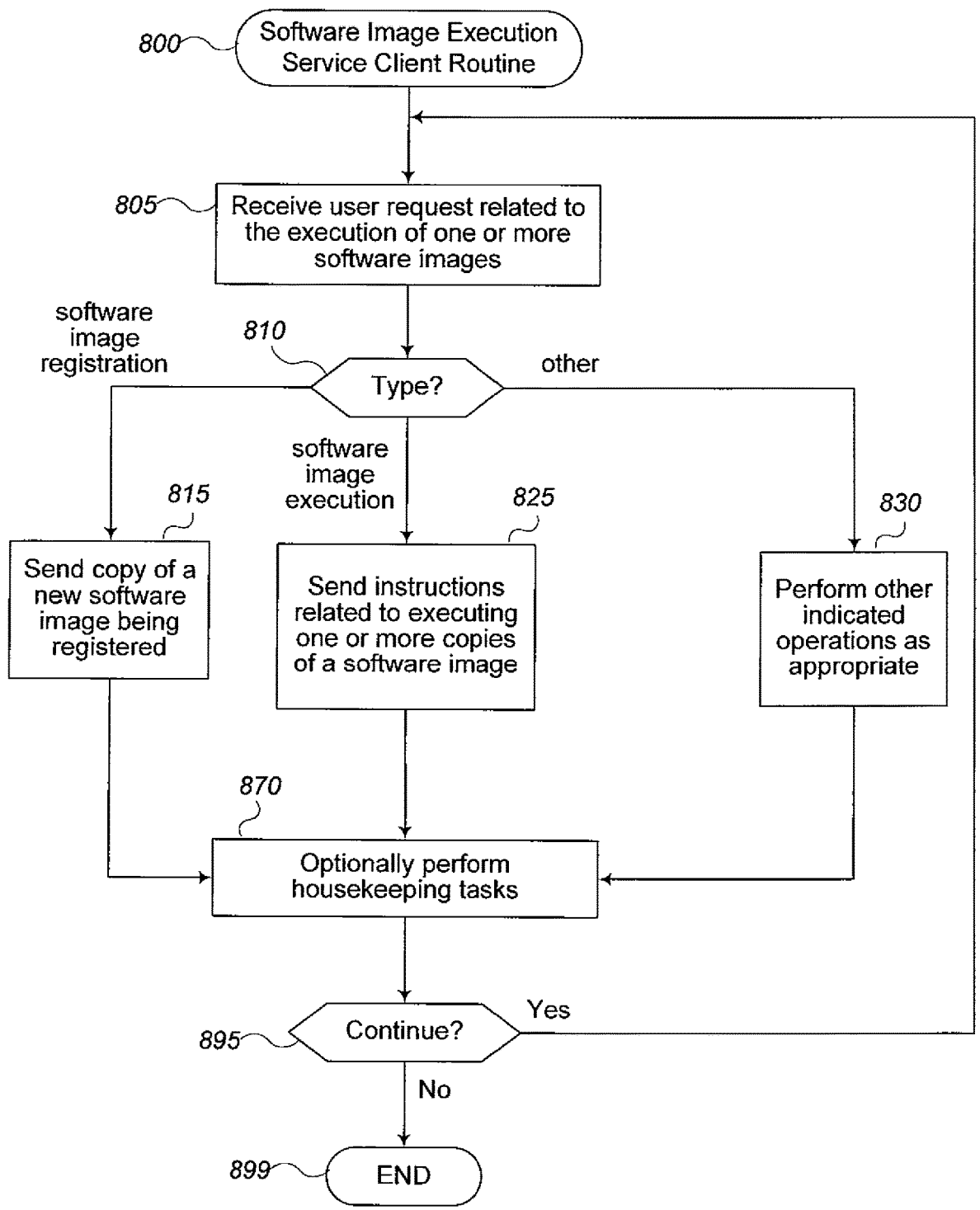
FIG. 8 is a flow diagram of an example embodiment of a Software Image Execution Service Client routine.

FIG. 8 illustrates a flow diagram of an example embodiment of a client routine 800 for a software image execution service, although in other embodiments a similar routine may act as a client for one or more other groups of one or more computing systems that may execute software images. The routine may be provided by, for example, an application (not shown) executing on one of the computing systems 470 of FIG. 4, such as to provide an interactive console to allow a human user to interact with a software image execution service.

The routine begins at block 805, where it receives instructions from a user or another type of message related to the execution of one or more copies of one or more software images. In block 810, the routine determines the type of the received message. If the message is related to registration of a new software image (or a new version of a previously registered software image), the routine proceeds to block 815 and sends a copy of or other indication of the new software image to be registered to the software image execution service (e.g., to a System Manager component of the software image execution service that manages software image execution). If the message is instead determined in block 810 to be related to the execution of a software image, the routine proceeds to block 825 to send a request to the software image execution service (e.g., to a System Manager component of the software image execution service) to execute one or more copies of a software image, such as in accordance with a previously obtained subscription for the software image (e.g., by supplying an image identifier and/or a user token obtained as part of the subscription). If it is instead determined in block 810 that some other type of request is received (e.g., to interact with an embodiment of a CSSIUF system to obtain a subscription to an indicated software image), the routine proceeds to block 830 and performs other indicated operations as appropriate. For example, the routine may send a request to the software image execution service to reserve computing resources at a future time to execute one or more indicated software image copies, send a status query to the software image execution service regarding current or prior execution of one or more software images, provide or update user-related information (e.g., as part of registering the user with the software image execution service), de-register or otherwise remove previously registered software images, suspend or terminate execution of one or more software image copies, etc.

After blocks 815, 825, or 830, the routine continues to block 870 and optionally performs housekeeping tasks, such as to update display information, store information received back from the software image execution service (not shown), make periodic status queries of the software image execution service, etc. After block 870, the routine proceeds to block 895 to determine whether to continue. If so, the routine returns to block 805, and if not, proceeds to block 899 and ends.

In addition, various embodiments may provide mechanisms for customer users and other users to interact with an embodiment of the software image execution service (or other group of multiple computing systems available to execute user software images) in various ways for purposes of executing software image copies. For example, as previously noted, some embodiments may provide an interactive console (e.g. a client application program providing an interactive user interface, a Web browser-based interface, etc.) from which users can manage general administrative functions related to the operation and management of hosted software virtual machine images or other software images (e.g., the creation or modification of user accounts; the provision of new software images; the initiation, termination, or monitoring of hosted software images; the reservation of time or other system resources; etc.). Additional details related to the operation of example embodiments of software image execution services and other software execution services with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" and U.S. application Ser. No. 11/692,038, filed Mar. 27, 2007 and entitled "Configuring Intercommunications Between Computing Nodes;" and U.S. application Ser. No. 11/851,345, filed Sep. 6, 2007 and entitled "Executing Programs Based On User-Specified Constraints;" each of which is incorporated herein by reference in its entirety.

Figure 9:
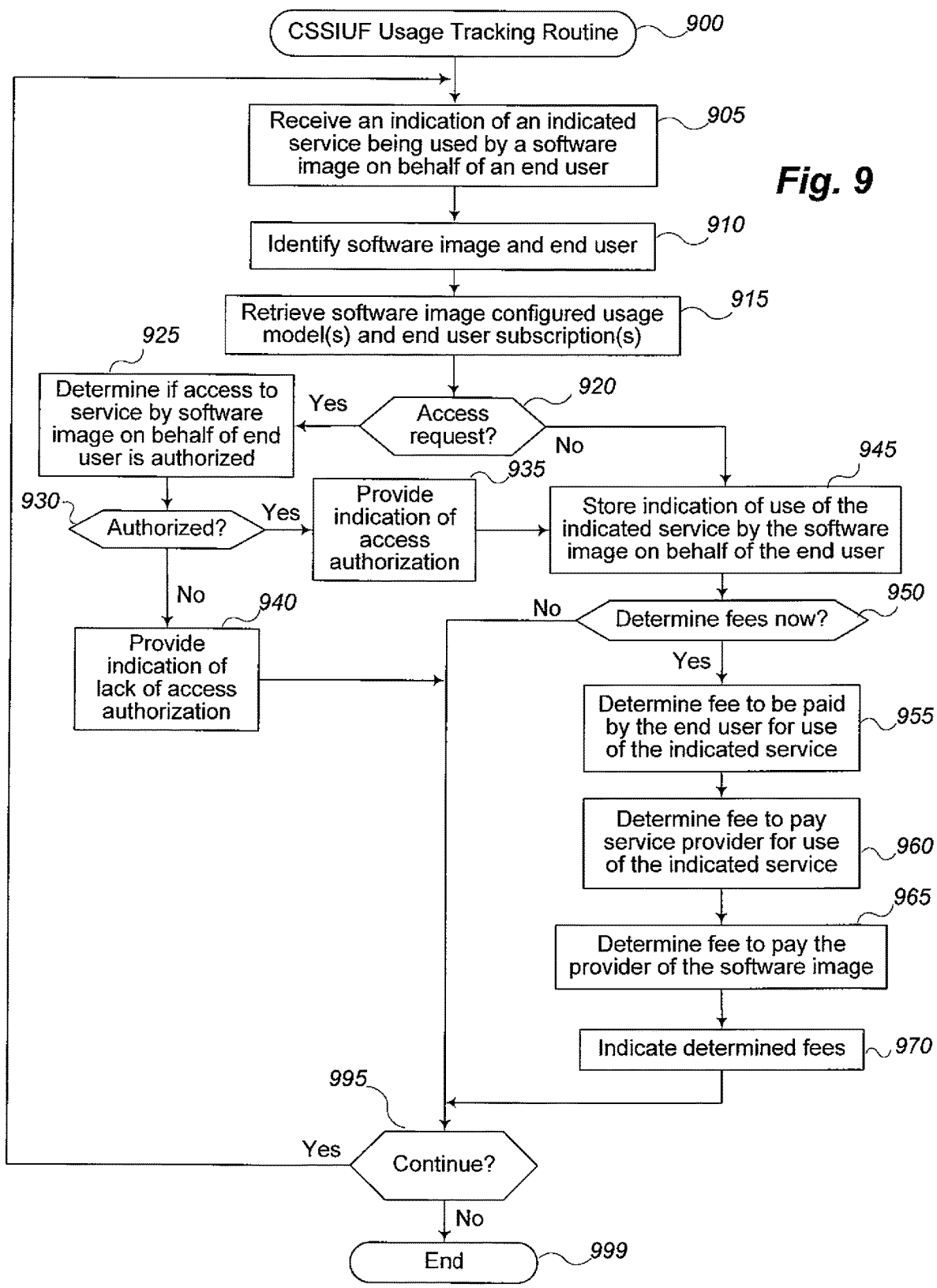
FIG. 9 is a flow diagram of an example embodiment of a CSSIUF Usage Tracking routine.

FIG. 9 is a flow diagram of an example embodiment of a CSSIUF Usage Tracking routine 900. The routine may for example, be provided by execution of a metering and/or billing component of the CSSIUF system 110 of FIGS. 1A-1C and/or of the CSSIUF system 440 of FIG. 4, such as to track usage of services by executing software images on behalf of end users in order to determine fees to be paid by the end users, and to allocate received fees among the software image creator users and service providers as appropriate.

The routine begins at block 905, where an indication is received that an indicated service is being used by an executing copy of a software image on behalf of an end user. The received indication may in some embodiments be received from the indicated service, while in other embodiments may be received from the executing software image copy and/or a selected software execution service that is executing the indicated software image. Furthermore, in the illustrated embodiment, the received indication may reflect an access request that is performed before the service use occurs, or may reflect an indication of actual service use that is made during or after the service use occurs. The received indication may in some embodiments include an indication of a software image key and either a user token or a user credential, and additional information may be received as well (e.g., the amount of use with respect to an indicated use dimension, a starting and/or ending time of use of the service, etc.). After receiving the indication, the routine continues to block 910, where the routine identifies the executing software image and the end user on whose behalf the software image is executing. In at least some embodiments, the routine identifies the software image based on a software image key received in block 905, and identifies the end user based on a user credential or token received in block 905. In the illustrated embodiment, the routine then proceeds to block 915 to retrieve information related to the identified software image and end user for use in determining access rights to the service and/or for use in determining corresponding fees for the service use, such as any configured usage models for the software image and any subscription information for the end user and the software image. In other embodiments, however, determinations regarding service use access and/or fee determination may be made in other ways, such as based on information included in a received user credential.

In the illustrated embodiment, the routine next continues to block 920 to determine whether the indication received in block 905 corresponds to an access request to determine whether the software image and end user are authorized to use the indicated service. If not, the routine proceeds to block 945 to store information about the use of the indicated service by the software image copy on behalf of the end user. If so, the routine instead continues to block 925 to determine if the access is authorized, such as based on the retrieved configured usage models and/or user subscription information, although in other embodiments the determination may be made in other manners (e.g., based on information included in the received user credential). After block 925, the routine continues to block 930 to determine whether the access is authorized, and if not continues to block 940 to provide an indication of a lack of access authorization. If the access is authorized, the routine continues instead to block 935 to provide an indication of access authorization to the indicated service. After block 935, the routine then continues to block 945 to store information about the use of the indicated service by the software image copy on behalf of the end user, such as prospectively based on the authorization, although in other embodiments may instead wait to track such use until the routine is notified of the actual use.

After block 945, the routine continues to block 950 to determine whether fees should be determined now, such as if fees are determined for each service use indication, or if a specified amount of time or service use have occurred since a last time that fees were determined. If not, or after block 940, the routine continues to block 995. If fees are to be determined now, however, the routine continues to block 955 to determine one or more fees to be paid by the end user. The fee(s) to be paid by the end user may be determined, for example, by retrieving the configured usage model for use of the indicated service by the executing software image, and applying the configured use price to any currently received information regarding an amount of use of the indicated service. If the fee determination is to be performed for more than just the current service indication, stored information about other service use by one or more software image copies of behalf of the end user may be retrieved and similarly used to determine one or more corresponding fees. Once the fee(s) to be paid by the end user are determined, the routine continues to block 960 to determine one or more fees to be paid to the provider of the indicated service and/or to other service providers. A fee to pay a service provider may be determined based on a predefined usage model for the service, as well as any current and/or stored corresponding service usage information. After determining the fees to pay the service provider(s), the routine continues to block 965 to determine the fee(s) to pay the creator user(s) of the software image(s) whose executing copies use the indicated service and/or other services on behalf of the user. For example, the fees to pay a software image provider may be determined based on the difference between the fees to be paid by the end user for use of the software image and the fees to pay the service provider(s) for use of services by the executing software image. In addition, if the CSSIUF system charges any fees, those fees may be subtracted from the resulting difference. Once the fee(s) to pay the software image creator user(s) are determined, the routine continues to block 970 to indicate the determined fees. In some embodiments, the indications may be stored until the end user is subsequently charged, while in other embodiments the end user may be charged in response to the indications. Furthermore, while not illustrated here, in some embodiments the routine may further proceed to allocate obtained fees as appropriate between the software image creator user(s) and the service provider(s), such as by initiating payment to the providers as appropriate.

After block 970, the routine continues to block 995 to determine whether to continue. If so, the routine returns to block 905, and if not continues to block 999 and ends.

Various additional functionality may be provided in various embodiments of the CSSIUF system. For example, in at least some embodiments, the entity providing the CSSIUF system and/or third-party service providers may set various criteria to be met by configured usage models for some or all services and/or software images, such as by indicating a minimum configured use price (e.g., a configured use price that exceeds the predefined use price for the service by a predetermined amount) and/or a maximum configured use price. The CSSIUF system may further enforce any such criteria when configured usage models are created. As a second example, in some embodiments one or more related individuals may be associated with a single user token. For example, if a copy of a software image is used by an entity rather than an individual, multiple individuals may be authorized to use a single end user token for a specified software image copy. Furthermore, in some embodiments a received software image key may be associated with a particular configured usage model for the software image, such that, if the software image has multiple configured usage models for use of multiple distinct services, a distinct software image key is issued for each configured usage model.

In addition, in some embodiments configured use prices may have other forms, such as tiered use prices. For instance, tiered use prices may be used to provide volume discounts to high-volume users of a software image. When tiered use prices are used, they may be specified in various manners. For example, information may be specified regarding how a tier-based usage model is structured, such as the start and end of various tiers (e.g., in units of the use price for the service, or in terms of conditions such as times for peak/off-peak pricing), whether the tiers are cumulative, etc.

Furthermore, as previously noted, in some embodiments a software image creator user may configure a usage model for a service to use a different use dimension than the use dimensions specified for the predefined usage model for the service. For example, instead of specifying prices for the use of a storage service based on a number of gigabytes of space used, the configured usage model for a software image may specify prices on other bases, such as a price for each DVD stored or for each picture stored. When such custom metering is performed, the software image may send information to the CSSIUF system to indicate when corresponding usage has occurred, such as to indicate that a particular user has stored three pictures. In other situations, the CSSIUF system may be able to determine at least some such types of corresponding usage automatically without receiving such usage information from a software image.

In addition, in some embodiments the CSSIUF system may enable the use of variable pricing that may be dynamically specified at runtime for software images, such as based on end user negotiation with a software image copy being used. If so, when a software image creator is interacting with the CSSIUF system to configure one or more usage models for a software image, the software image creator may indicate that variable pricing is available to be used with the software image. The software image creator may then design or configure the software image to support such variable pricing. For example, an end user of the software image may be able to bid on or otherwise request an indicated price for an amount of use of the software image, such as an indicated price that is lower than the price that would otherwise be charged for execution of the software image. The software image may then optionally determine to accept or reject the indicated price based on one or more of various factors. For example, the software image may accept a lower indicated price based on a minimum volume of use, based on use that occurs at times when demand for use of the software image and/or underlying services is low, based on use that is subject to more restrictive terms (e.g., that may be discontinued if specified conditions occur, such as other higher-paying demand occurs), etc. If the software image accepts a particular indicated price for use by an end user, the software image may then provide information to the CSSIUF system to specify the price to be charged for corresponding use by the end user, so that the CSSIUF system may charge the end user the appropriate fees for the use. For example, the software image may provide such use price information when the software image copy makes a request for a particular use of an invocable service and/or when the software image copy provides usage information to the CSSIUF system.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
   receiving, by one or more configured computing systems affiliated with a software image execution service, information from a first user of the software image execution service to register a software image of the first user as being available for execution by at least some other users of the software image execution service, wherein the software image execution service has a plurality of host computing systems for use in executing software images of users, and wherein the software image has an associated usage model specified by the first user that includes access criteria to identify the at least some other users and that includes one or more use restrictions to control execution of the software image by the at least some other users;
   receiving, by the one or more configured computing systems, a request from a second user of the software image execution service to execute the software image;
   determining, by the one or more configured computing systems, and based at least in part on the access criteria of the usage model associated with the software image, that the second user is authorized to execute the software image; and
   initiating, by the one or more configured computing systems, execution of a copy of the software image by the software image execution service on behalf of the second user on at least one of the plurality of host computing systems, including to control the execution based at least in part on the one or more use restrictions of the usage model associated with the software image.

2. The computer-implemented method of claim 1 further comprising providing capabilities for users of the software image execution service to subscribe to use the software image, and wherein the determining that the second user is authorized to execute the software image is based at least in part on whether the second user has subscribed to use the software image.

3. The computer-implemented method of claim 1 further comprising receiving an indication from the second user to provide support services functionality during the execution of the copy of the software image from a third user who is separate from the first and second users, and making the support services available to the second user during the execution of the copy of the software image.

4. The computer-implemented method of claim 1 wherein the access criteria specify that the software image is accessible to only a subset of the users of the software image execution service, and wherein the determining that the second user is authorized to execute the software image includes determining that the second user is part of the subset.

5. The computer-implemented method of claim 1 further comprising:
   determining, by the one or more configured computing systems, that the copy of the software image executing on behalf of the second user uses a third-party network-accessible service that is provided external to the software image execution service; and
   initiating, by the one or more configured computing systems, access of the executing copy of the software image to the third-party network-accessible service over one or more intervening computer networks.

6. The computer-implemented method of claim 1 wherein the software image is a virtual machine image, wherein the at least one host computing system hosts multiple virtual machines, and wherein the execution of the copy of the software image includes use of one of the multiple hosted virtual machines.

7. A non-transitory computer-readable medium having stored contents that cause a computing system of a software image execution service to perform a method, the method comprising:

receiving, by the software image execution service, information from a first user of the software image execution service that indicates a software image available for execution by at least some other users of the software image execution service and that indicates a usage model configured by the first user and including one or more criteria for use in controlling execution of the software image by other users via the software image execution service;

determining, by the software image execution service, that a requested execution of the software image by a second user distinct from the first user satisfies the one or more criteria; and executing, by at least one of a plurality of host computing systems of the software image execution service, the software image via the software image execution service on behalf of the second user.

8. The non-transitory computer-readable medium of claim 7 wherein the software image is created by the first user, and wherein the one or more criteria included in the usage model include one or more use restrictions to prevent one or more indicated types of use of the software image, and wherein the determining that the requested execution of the software image by a second user satisfies the one or more criteria includes determining that the requested execution is not one of the one or more indicated types of use.

9. The non-transitory computer-readable medium of claim 7 wherein the software image is a loadable virtual machine image, wherein the plurality of host computing systems include one or more computing systems that host one or more virtual machines each capable of executing a virtual machine image, and wherein the stored contents include instructions that, when executed, cause the computing system of the software image execution service to perform the executing of the software image by loading and executing the virtual machine image on at least one of the hosted virtual machines.

10. The non-transitory computer-readable medium of claim 7 wherein the one or more criteria included in the usage model includes one or more access criteria to identify one or more other users of the software image execution service who are not allowed to execute the software image, and wherein the determining that the requested execution of the software image by a second user satisfies the one or more criteria includes determining that the second user is allowed to execute the software image based at least in part on not being one of the one or more other users.

11. A computing system comprising:
one or more processors; and
one or more memories storing instructions that, when executed by at least one of the one or more processors, configure the computing system to manage execution of software virtual machine programs for users of a software execution service, the software execution service having a plurality of computing systems that host virtual machines, the managing of the execution of the software virtual machine programs including:
receiving information from a first user regarding a software virtual machine program from the first user that is available for execution by other users via the software execution service, the received information indicating a usage model configured by the first user for use with the software virtual machine program;
receiving a request to execute the software virtual machine program via the software execution service on behalf of a second user distinct from the first user;
determining that the second user is authorized to execute the software virtual machine program in accordance with the configured usage model; and
initiating execution of the software virtual machine program by at least one of the hosted virtual machines of the software execution service on behalf of the second user.

12. The computing system of claim 11 wherein the software virtual machine program includes at least one application program.

13. The computing system of claim 11 wherein the software execution service further provides a plurality of resources for the plurality of computing systems including at least one of an amount of use of processor time, an amount of use of network bandwidth to transfer data to the executing software programs, or an amount of use of network bandwidth to transfer data from the executing software programs, and wherein the initiating of the execution of the software virtual machine program includes selecting one or more amounts of the resources of the software execution service to be provided for the executing software virtual machine program, and performing the execution using the selected one or more amounts of the resources.

14. The computing system of claim 11 wherein the configured usage model specifies use conditions to control how other users are allowed to execute the software virtual machine program via the software execution service, and wherein the determining that the second user is authorized to execute the software virtual machine program in accordance with the configured usage model is based at least in part on the request satisfying the use conditions.

15. The computing system of claim 11 wherein the configured usage model specifies access criteria to control which other users are allowed to execute the software virtual machine program via the software execution service, and wherein the determining that the second user is authorized to execute the software virtual machine program in accordance with the configured usage model is based at least in part on the second user satisfying the specified access criteria.

* * * * *